United States Patent
Walley et al.

(10) Patent No.: US 7,952,962 B2
(45) Date of Patent: May 31, 2011

(54) DIRECTIONAL MICROPHONE OR MICROPHONES FOR POSITION DETERMINATION

(75) Inventors: John Walley, Ladera Ranch, CA (US); Ahmadreza (Reza) Rofougaran, Newport Coast, CA (US); Nambirajan Seshadri, Irvine, CA (US); Brima B. Ibrahim, Aliso Viejo, CA (US); Maryam Rofougaran, Rancho Palos Verdes, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 383 days.

(21) Appl. No.: 12/135,341

(22) Filed: Jun. 9, 2008

(65) Prior Publication Data

US 2008/0316863 A1 Dec. 25, 2008

Related U.S. Application Data

(60) Provisional application No. 60/936,724, filed on Jun. 22, 2007.

(51) Int. Cl.
*G01S 3/80* (2006.01)
(52) U.S. Cl. ....................................................... 367/124
(58) Field of Classification Search .................. 367/124, 367/119, 120, 128, 907
See application file for complete search history.

(56) References Cited

U.S. PATENT DOCUMENTS

| | | | | |
|---|---|---|---|---|
| 2,397,746 A * | 4/1946 | Lewis | ........................... | 367/120 |
| 4,639,900 A * | 1/1987 | Gustafson | ..................... | 367/128 |
| 5,214,615 A * | 5/1993 | Bauer | ........................... | 367/128 |
| 5,412,619 A * | 5/1995 | Bauer | ........................... | 367/128 |
| 5,526,433 A * | 6/1996 | Zakarauskas et al. | ........ | 367/120 |
| 5,528,557 A * | 6/1996 | Horn | ............................. | 367/907 |
| 7,146,014 B2 * | 12/2006 | Hannah | ........................ | 367/123 |
| 7,672,196 B1 * | 3/2010 | Hanyu | .......................... | 367/124 |
| 2005/0041529 A1 * | 2/2005 | Schliep et al. | ................. | 367/99 |
| 2008/0316324 A1 * | 12/2008 | Rofougaran et al. | ...... | 348/222.1 |
| 2008/0316863 A1 * | 12/2008 | Walley et al. | ................. | 367/135 |

(Continued)

OTHER PUBLICATIONS

Hala Elsadek, Hesham Eldeeb, Franco De-Flaviis, Luis Jofre, Esmat Abdallah, and Essam Hashish, "A Compact 3D-microwave holographic pointer system using a size reduced microstrip planar array," Proceedings of the 2001 IEEE International Conference on Systems, Man, and Cybernetics, Meeting Date: Oct. 7-10, 2001, Tucson, AZ, vol. 1, pp. 407-411, (5 pages), ISBN: 0-7803-7087-2.

(Continued)

*Primary Examiner* — Dan Pihulic
(74) *Attorney, Agent, or Firm* — Garlick Harrison & Markison; Timothy W. Markison; Shayne X. Short

(57) ABSTRACT

Directional microphone or microphones for position determination. One or multiple directional microphones are implemented in various locations to perform acoustic wave capture of acoustic waves associated with object (e.g., a player, a gaming object, a game controller, etc.). The generator of such acoustic waves may be co-located with the object (e.g., integrated into the object if the object is a device such as a gaming object, a game controller, etc., or integrated into clothing worn by a player such as on a hat, a jacket, etc.). The acoustic waves described herein may be generated by any number of means/devices including audio output devices, speakers, pulse wave generators, audio oscillators, etc. Moreover, such acoustic waves may be ultrasonic. A game module and/or processing module processes directional vectors associated with positions of the directional microphones when detecting relative maximum amplitude of an acoustic wave emits by an acoustic wave generator.

27 Claims, 29 Drawing Sheets

U.S. PATENT DOCUMENTS

2008/0318595 A1* 12/2008 Rofougaran ............... 455/456.1
2008/0318684 A1* 12/2008 Rofougaran .................... 463/39
2009/0017910 A1*  1/2009 Rofougaran et al. ........... 463/36

OTHER PUBLICATIONS

Hala Elsadek, Hesham Eldeeb, Franco De-Flaviis, Luis Jofre, and Esmat Abdallah, "Microstrip Multi-element diversity antenna array for three dimensional microwave holographic input pointer (Holo3D)," Antennas and Propagation Society International Symposium, 2002, IEEE, vol. 3, 2002, pp. 226-229, (4 pages), ISBN: 0-7803-7330-8.

Jeremy Kopchak of Xgaming, Inc., "E3 Wii Controller Nintendo® Wiimote: Technology Limitations," 2005, (4 pages).

C. D. Haworth, Y. De Saint-Pern, Y.R. Petillot, and E. Trucco of Heriot-Watt Univ., Edinburgh, UK, "Public security screening for metallic objects with millimetre-wave images," The IEE International Symposium on Imaging for Crime Detection and Prevention, 2005, ICDP 2005, Jun. 7-8, 2005, pp. 1-4, (4 pages), ISBN: 0-86341-535-0.

* cited by examiner

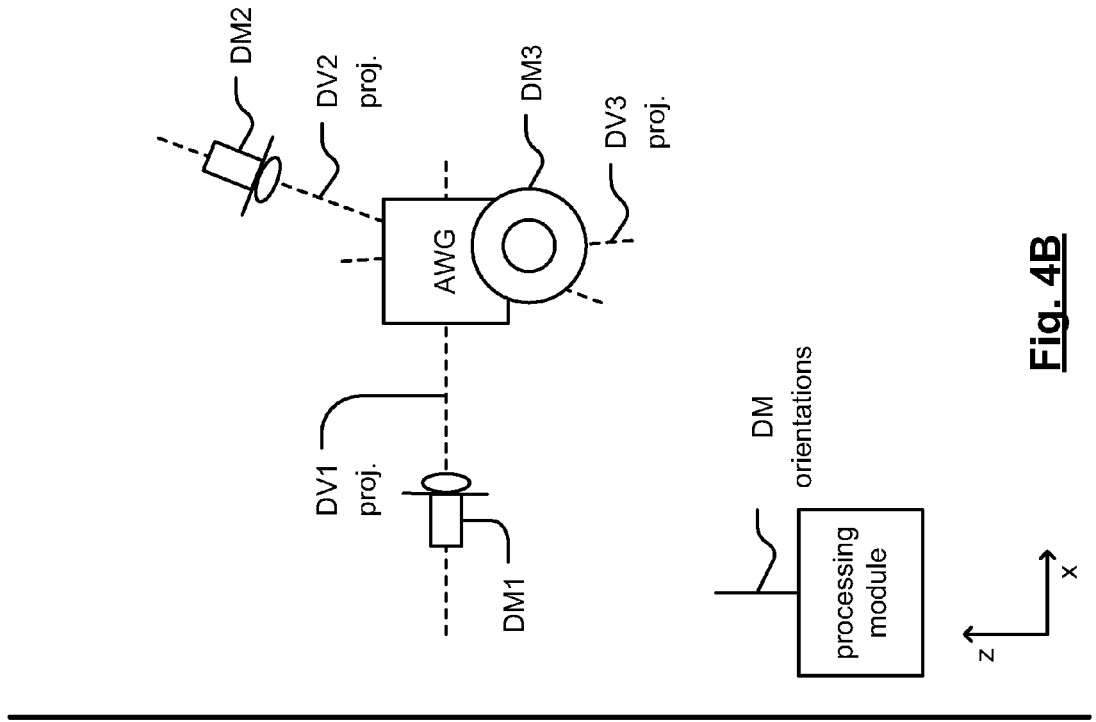
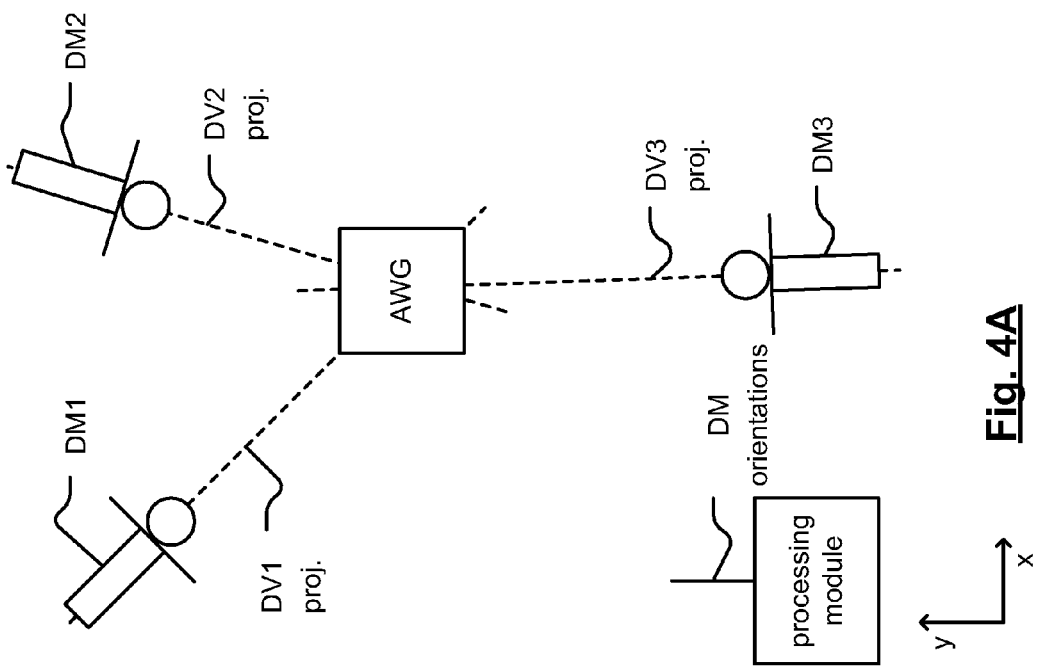

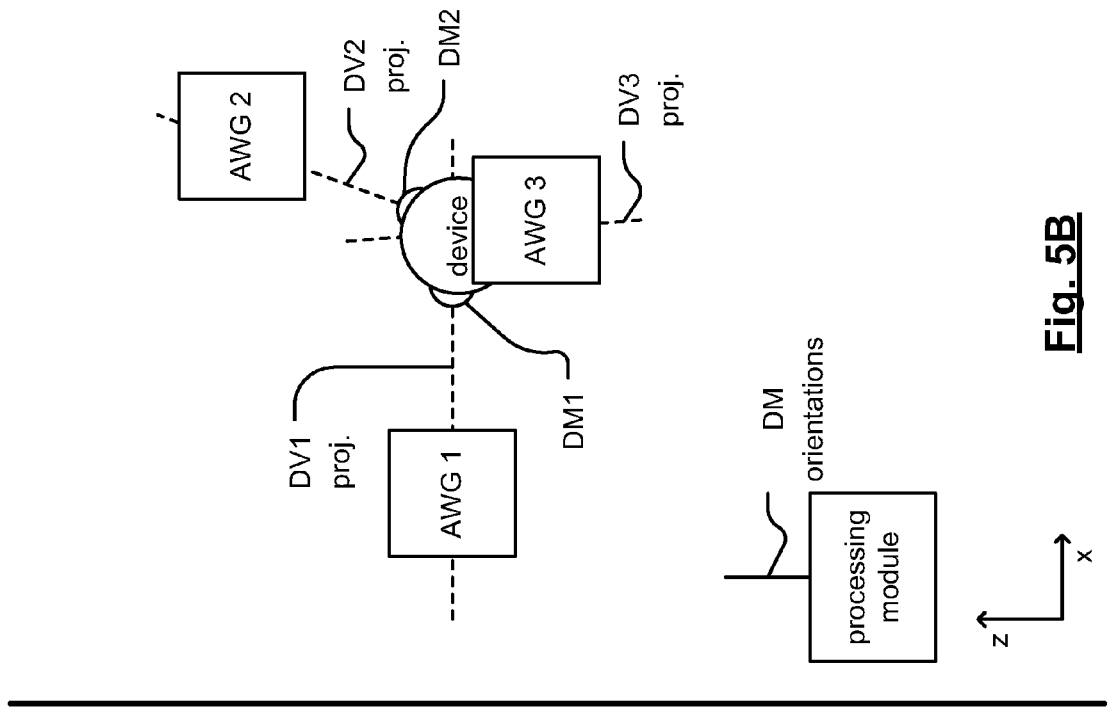
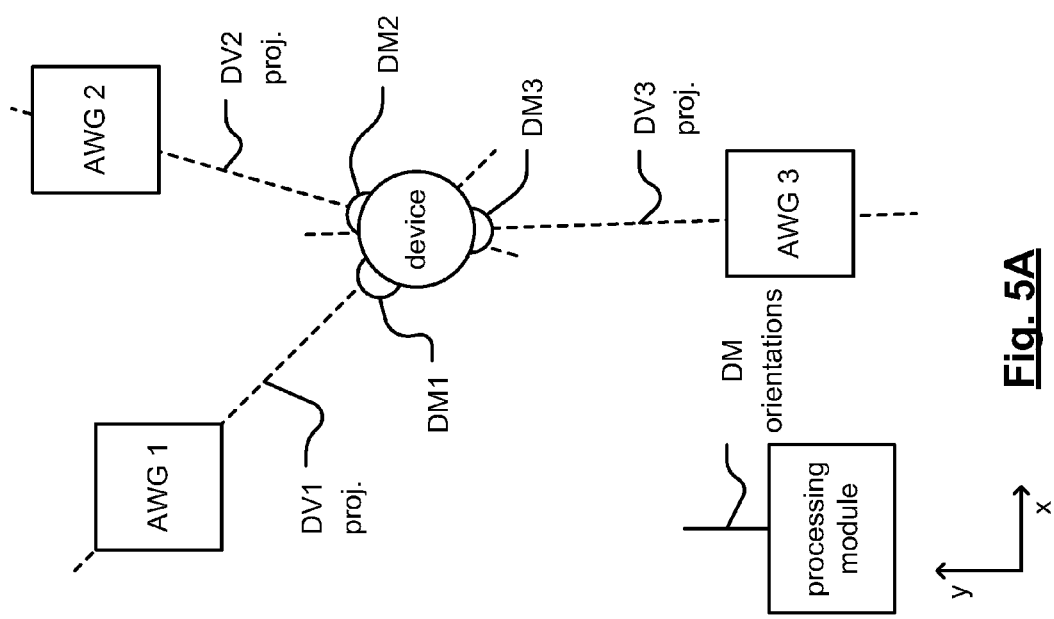
Fig. 5A
Fig. 5B

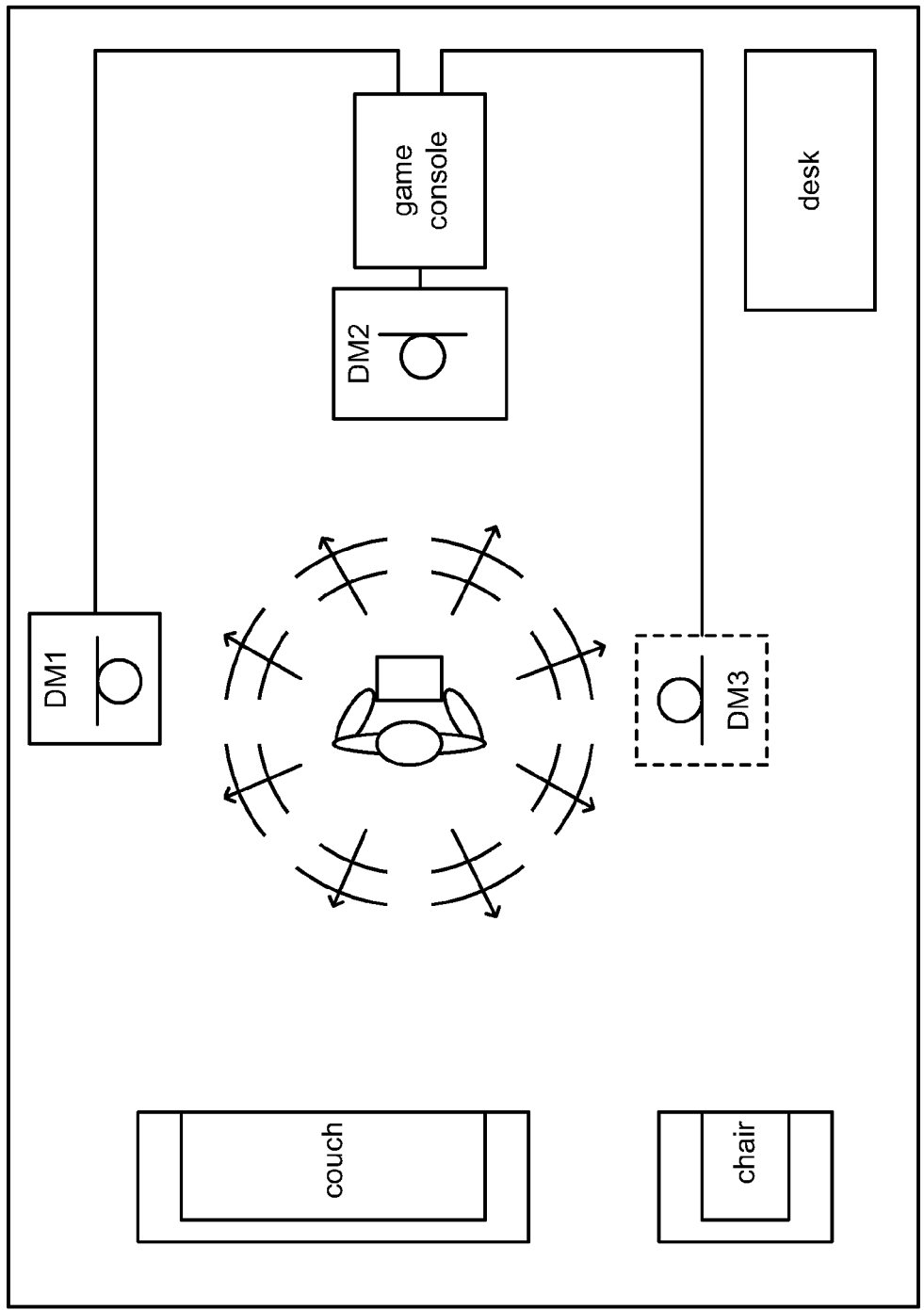
Fig. 11
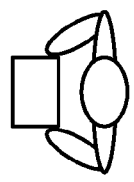
= (1) player (2) gaming object and/or (3) game controller = (1) player (2) gaming object and/or (3) game controller

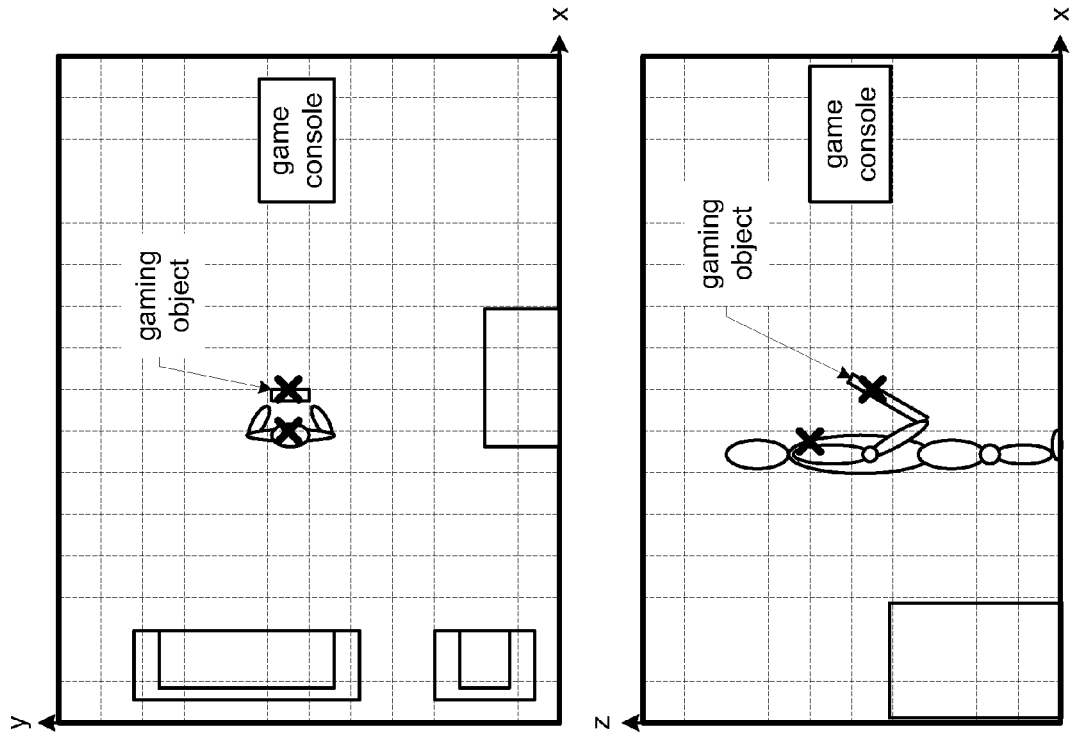
Fig. 15
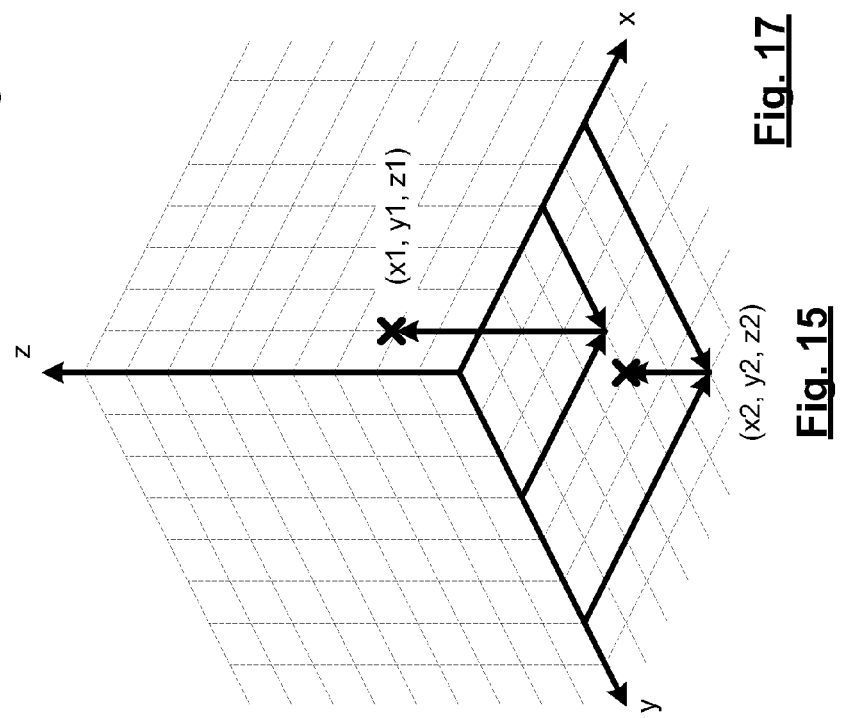
Fig. 16
Fig. 17

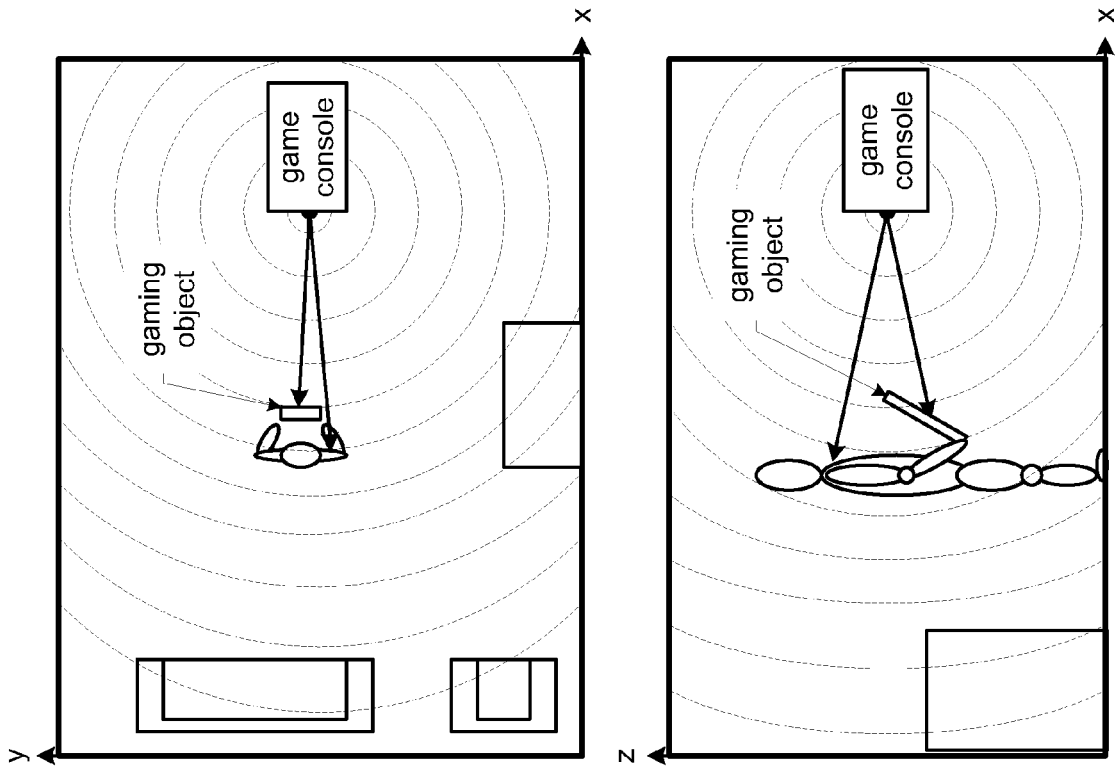
Fig. 19
Fig. 20
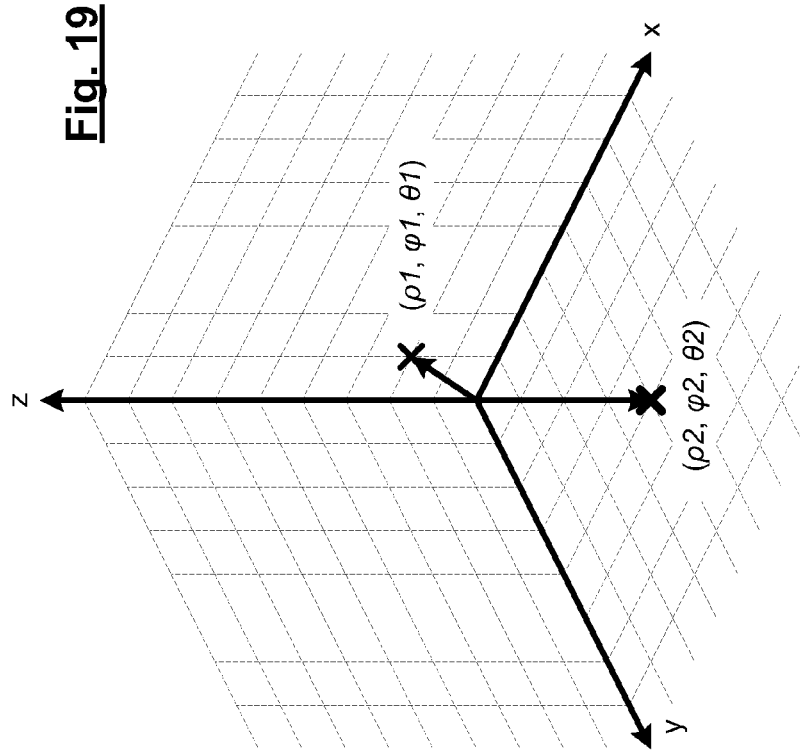
Fig. 18

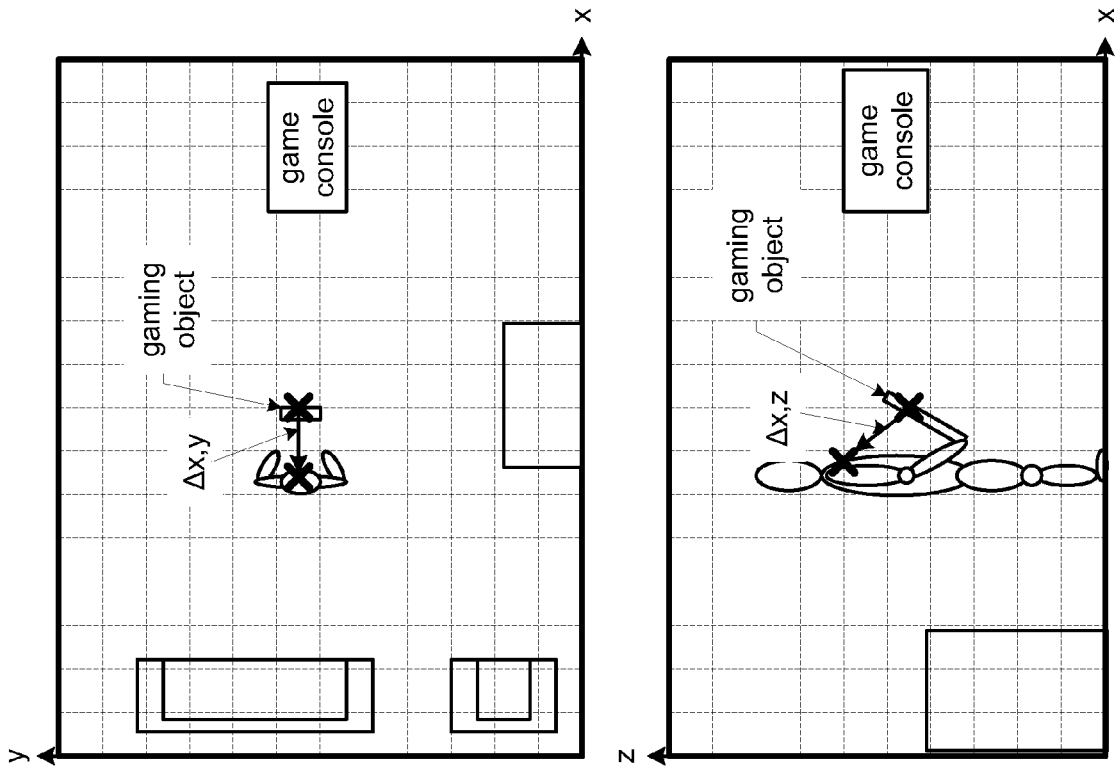
Fig. 24
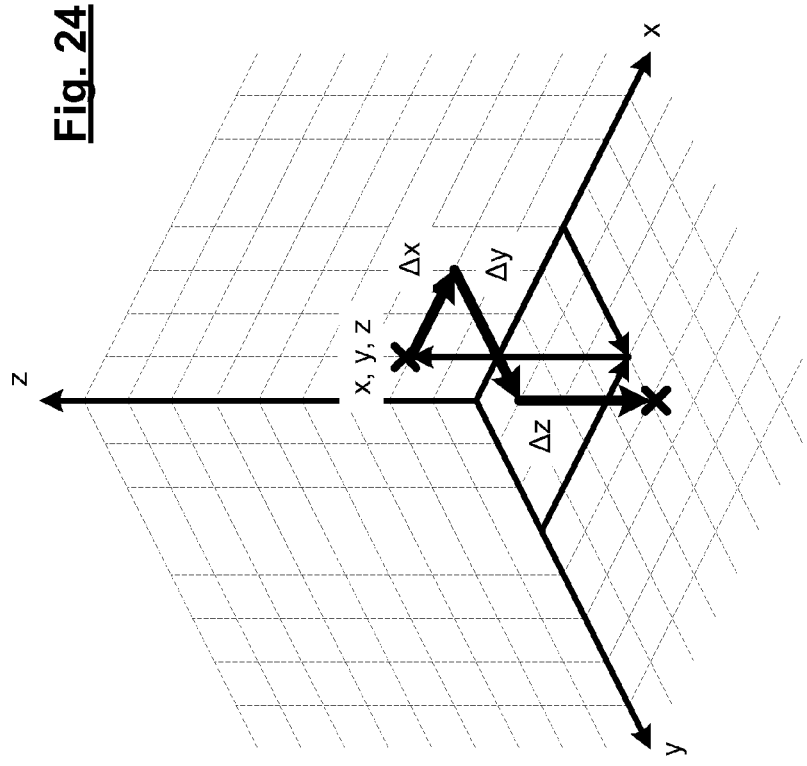
Fig. 25
Fig. 23

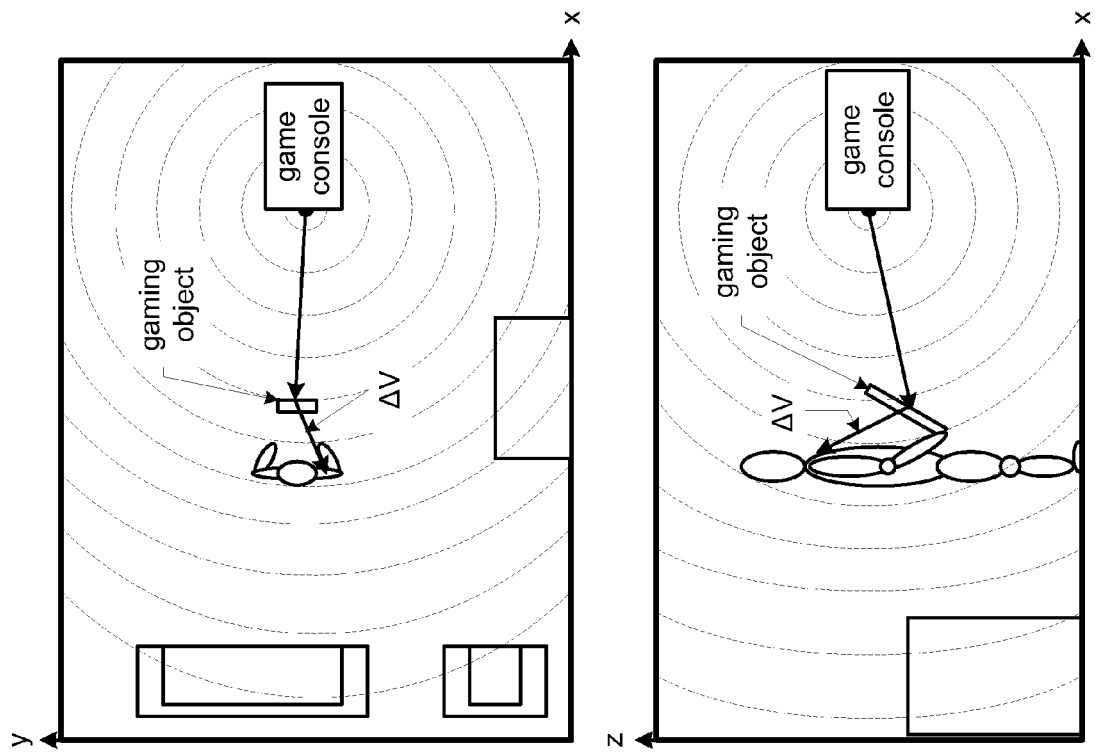
Fig. 27
Fig. 28
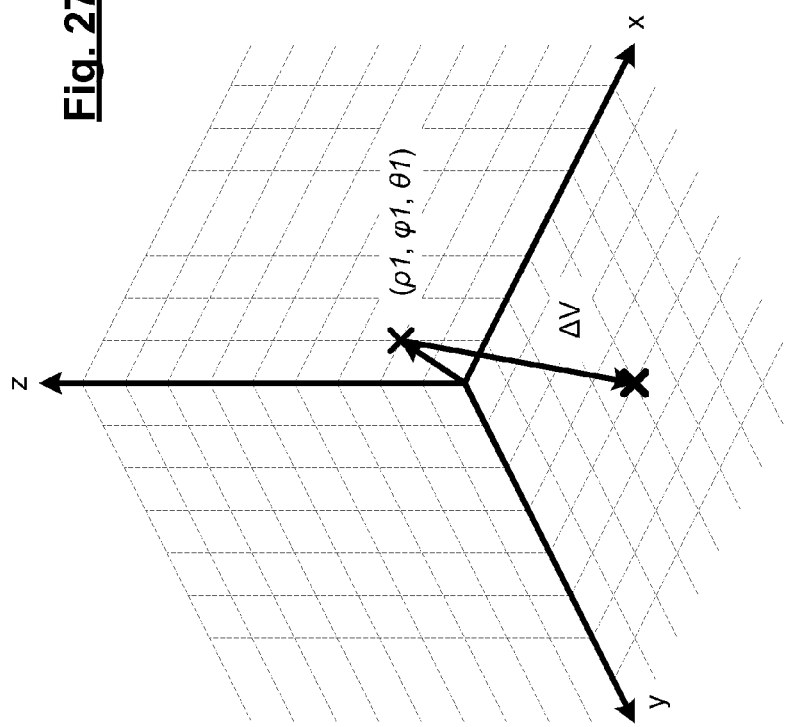
Fig. 26

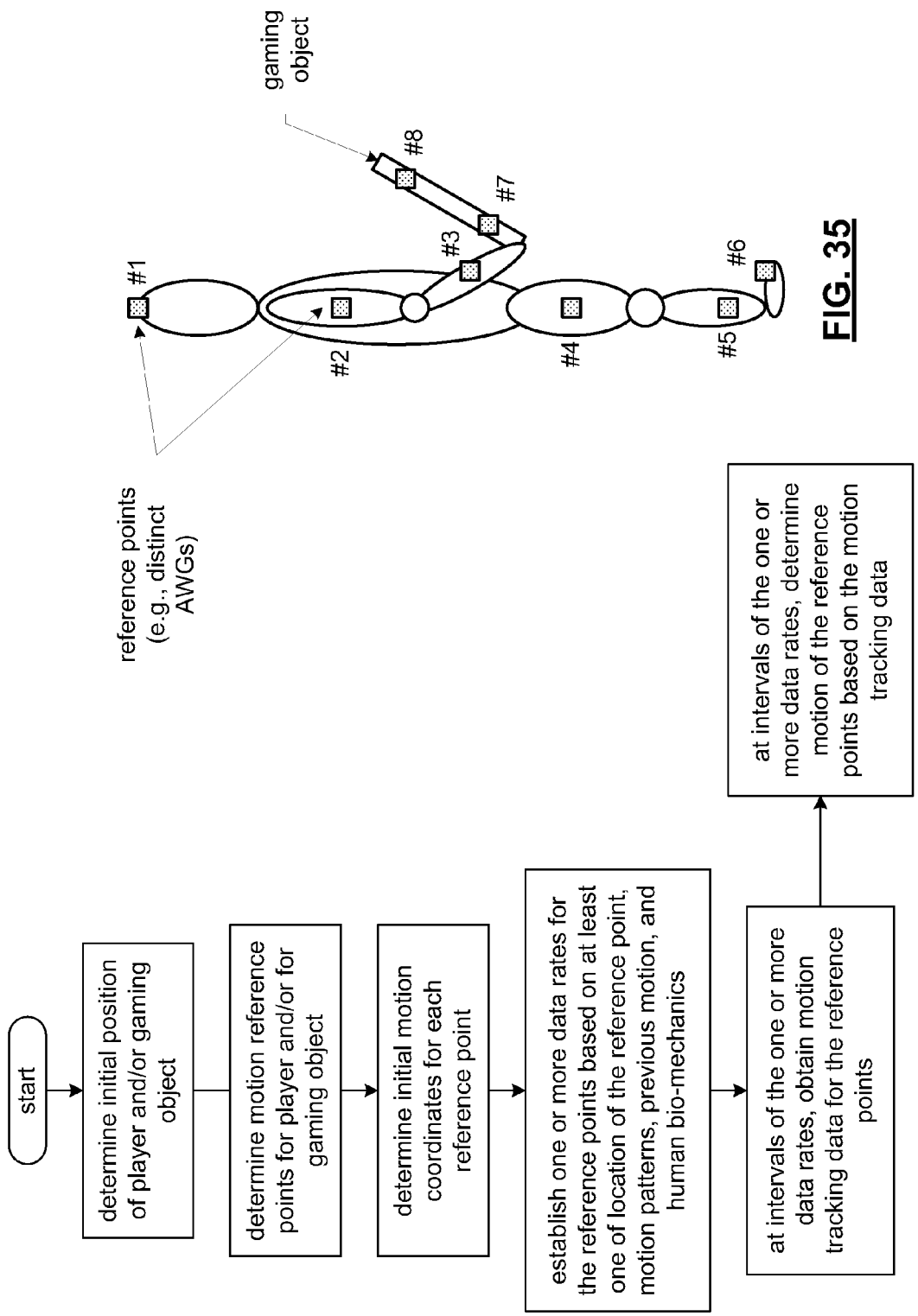

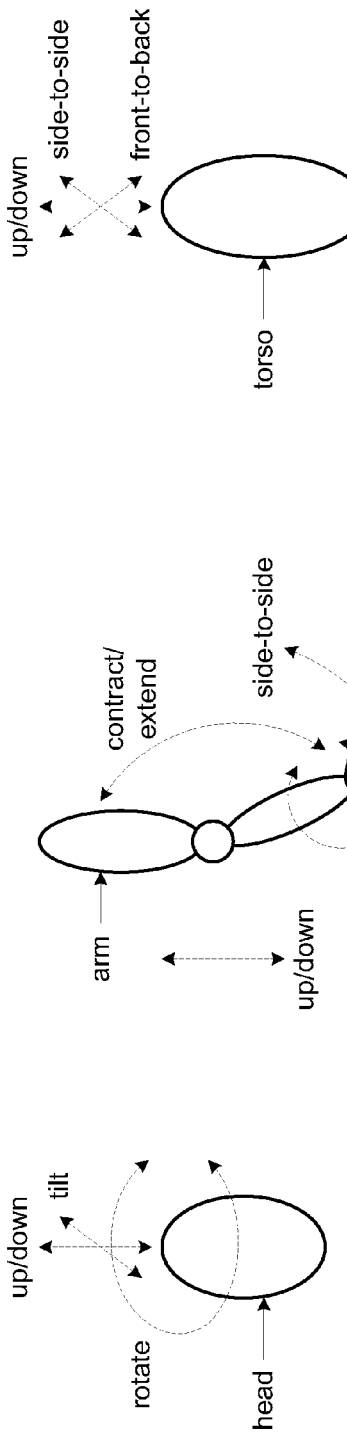
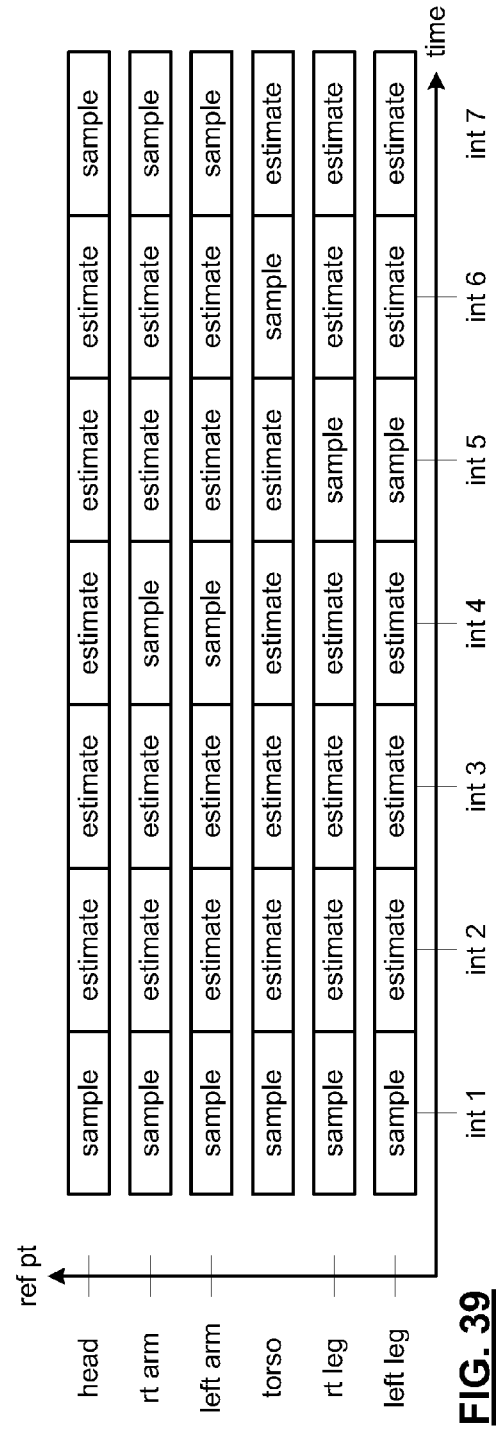

DIRECTIONAL MICROPHONE OR MICROPHONES FOR POSITION DETERMINATION

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Application Ser. No. 60/936,724, entitled "Position and motion tracking of an object,", filed Jun. 22, 2007.

BACKGROUND OF THE INVENTION

1. Technical Field of the Invention

The invention relates generally to position and tracking systems; and, more particularly, it relates to such systems that employ acoustic waves detected by directional microphones to determine position of or track movement of an object.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, radio frequency (RF) wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof. As another example, infrared (IR) communication systems may operate in accordance with one or more standards including, but not limited to, IrDA (Infrared Data Association).

Depending on the type of RF wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each RF wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In most applications, radio transceivers are implemented in one or more integrated circuits (ICs), which are inter-coupled via traces on a printed circuit board (PCB). The radio transceivers operate within licensed or unlicensed frequency spectrums. For example, wireless local area network (WLAN) transceivers communicate data within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain.

In IR communication systems, an IR device includes a transmitter, a light emitting diode, a receiver, and a silicon photo diode. In operation, the transmitter modulates a signal, which drives the LED to emit infrared radiation which is focused by a lens into a narrow beam. The receiver, via the silicon photo diode, receives the narrow beam infrared radiation and converts it into an electric signal.

IR communications are used video games to detect the direction in which a game controller is pointed. As an example, an IR sensor is placed near the game display, where the IR sensor to detect the IR signal transmitted by the game controller. If the game controller is too far away, too close, or angled away from the IR sensor, the IR communication will fail.

Further advances in video gaming include three accelerometers in the game controller to detect motion by way of acceleration. The motion data is transmitted to the game console via a Bluetooth wireless link. The Bluetooth wireless link may also transmit the IR direction data to the game console and/or convey other data between the game controller and the game console.

While the above technologies allow video gaming to include motion sensing, it does so with limitations. As mentioned, the IR communication has a limited area in which a player can be for the IR communication to work properly. Further, the accelerometer only measures acceleration such that true one-to-one detection of motion is not achieved.

Thus, the gaming motion is limited to a handful of directions (e.g., horizontal, vertical, and a few diagonal directions).

Therefore, a need exists for motion tracking and positioning determination for video gaming and other applications that overcome the above limitations.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 4A and FIG. 4B are diagrams of an embodiment of an apparatus that employs directional vectors associated with detecting relative maximum amplitudes of an acoustic waves to determine position of the source of the acoustic waves.

FIG. 5A and FIG. 5B are diagrams of an embodiment of an apparatus that employs directional vectors associated with detecting relative maximum amplitudes of an acoustic waves to determine position of the device that has detected the acoustic waves.

FIG. 11 is a diagram illustrating an embodiment of a gaming system including a game console that determines a position of a source based on acoustic waves detected by multiple directional microphones that are wire-coupled to the game console.

FIG. 15, FIG. 16, and FIG. 17 are diagrams of an embodiment of a coordinate system of a gaming system.

FIG. 18, FIG. 19, and FIG. 20 are diagrams of another embodiment of a coordinate system of a gaming system.

FIG. 23, FIG. 24, and FIG. 25 are diagrams of another embodiment of a coordinate system of a gaming system.

FIGS. 26, FIG. 27, and FIG. 28 are diagrams of another embodiment of a coordinate system of a gaming system.

FIG. 34 is a diagram of a method for determining motion.

FIG. 35 is a diagram of an example of reference points on a player and/or gaming object.

FIG. 36, FIG. 37, and FIG. 38 are diagrams of examples of motion patterns.

FIG. 39 is a diagram of an example of motion estimation.

DETAILED DESCRIPTION OF THE INVENTION

Figure 1:
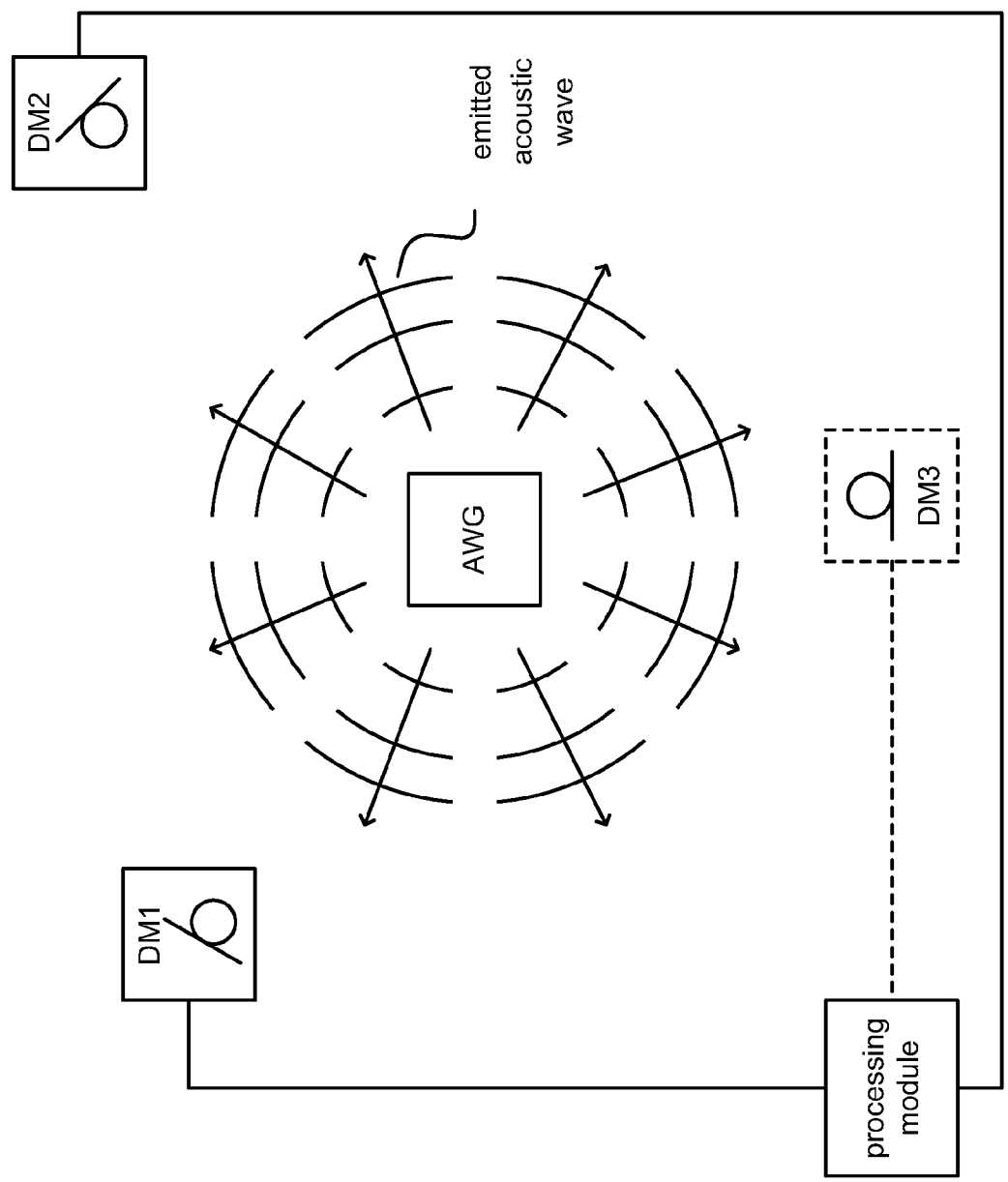
FIG. 1 is a diagram of an embodiment an apparatus that performs position determination and/or movement tracking via acoustic wave detection by directional microphones.

FIG. 1 is a diagram of an embodiment an apparatus that performs position determination and/or movement tracking via acoustic wave detection by directional microphones. The apparatus includes a number of directional microphones implemented to receive acoustic waves emitted from a source (e.g., an acoustic wave generator). A processing module is coupled to determine position of the source with respect to directional vectors associated with the directional microphones receiving a maximum amplitude of the acoustic wave. It is noted that each of the directional microphones may detect a different relative maximum amplitude while still detecting an acoustic emitted from a common source (e.g., the two directional microphones are located in different locations and one directional microphone may be closer to the source than the other, etc.).

While acoustic waves are referred to herein, it is noted that an ultrasonic wave source may be employed when using a directional microphone that has a sufficient frequency response to detect ultrasonic waves. For example, a directional microphone may have ability detect ultrasonic acoustic waves in addition to detecting audible acoustic waves (e.g., within the typically understood human range of hearing which includes acoustic waves having frequencies between approximately 20 Hz to approximately 20 kHz). As one example, an ultrasonic waves having a frequency of approximately 25 kHz may be employed (e.g., which is beyond the typical range of human hearing) without departing from the scope and spirit of the invention.

Once the position of the source is determined, the position may be mapped within a virtual 3D (three-dimensional) coordinate system. A wide variety of applications may employ this functionality including mapping a physical location of a person, player, and/or object to a virtual 3D coordinate system that depicts the person, player, and/or object and the position and/or movement thereof.

The determining of a directional vector associated with a particular directional microphone receiving a maximum amplitude of the acoustic wave may be determined in a variety of ways. For example, this may be performed by sweeping a directionality of a directional microphone (or directional microphone array that includes multiple, co-located directional microphones) electrically and/or mechanically.

For example, when considering a directional microphone array that includes multiple directional microphones (or that simply includes one directional microphone but that has multiple sub-components, each of which is individually adjustable), the gains of the various directional microphones (or sub-components of a single directional microphone) are adjusted to change the directionality of the directional microphone or directional microphone array. An entirety of a range across which the directionality may be adjusted maybe swept to ensure that a maximum relative detected amplitude of an acoustic wave does in fact correspond to a direction from which the acoustic wave is being emitted.

Alternatively, the directionality of a directional microphone (or directional microphone array) may be adjusted mechanically. An actuator may be integrated with the directional microphone (or directional microphone array), or the directional microphone (or directional microphone array) may be mounted on an actuator. The directionality may then be adjusted by changing the physical orientation of the directional microphone (or directional microphone array).

Clearly, a combination of electrical and mechanical directionality sweeping may be performed without departing from the scope and spirit of the invention. For example, mechanical directionality sweeping may be performed initially to try to narrow a region in which electrical directionality sweeping will then be performed (e.g., electrical directionality sweeping may provide for a smaller granularity of directionality adjustment than mechanical directionality sweeping).

Moreover, it is noted that the directional microphones may be 'smart' directional microphones that include means by which the directionality for detecting a relative maximum amplitude of the acoustic wave is determined. As just some possible examples, the directional microphone may include a gyroscope, global positioning system (GPS) capability, and/or other location and/or orientation determining means, and information corresponding to the orientation of a particular directional microphone (e.g., its position and orientation, sometimes referred to as 'pose'). From such information, the directional vector associated with that directional microphone, when detecting the relative maximum amplitude of the acoustic wave, may be determined.

It is noted that, while position determination is described, the movement of the source of the acoustic wave may also be determined by merely updating the position of the source as a function of time. For example, the processing module may determine a first position of the acoustic wave generator during a first time, and the processing module may then determine a second position of the acoustic wave generator during a second time. The movement of the acoustic wave generator may be estimated by comparing the first determined position and the second determined position. The rate of the movement of the acoustic wave generator may be determined by also considering the times associated with the each of the first determined position and the second determined position.

It is also noted that the physical construction of the directional microphones may be varied in different embodiments. One type of microphone, having a very small form factor, is a micro-electrical-mechanical system (MEMS) microphone. A MEMS microphone is composed of a pressure sensitive diaphragm etched into an integrated circuit. The use of such directional microphone (e.g., as being MEMS directional microphones) may be particular attractive in certain embodiments. For example, a number of electronic devices, that each includes at least one integrated circuit, could be placed throughout a region to perform detection of acoustic waves.

In an alternative embodiment, such integrated circuits including MEMS directional microphones could be emplaced on an article of clothing worn by a person, distributed over a object, etc. to perform detection of acoustic waves emitted from various locations in a region. In such a way, determination of the position of multiple portions of such a person (e.g., a head, a torso, an arm, etc.), object (edges of the object, a face of the object, a back of the object, etc.), etc. may be determined.

Moreover, it is noted that while wire-coupling between the directional microphones and the processing module are illustrated in this embodiment, wireless communication may also employed between the various components of such an apparatus without departing from the scope and spirit of the invention.

Figure 2:
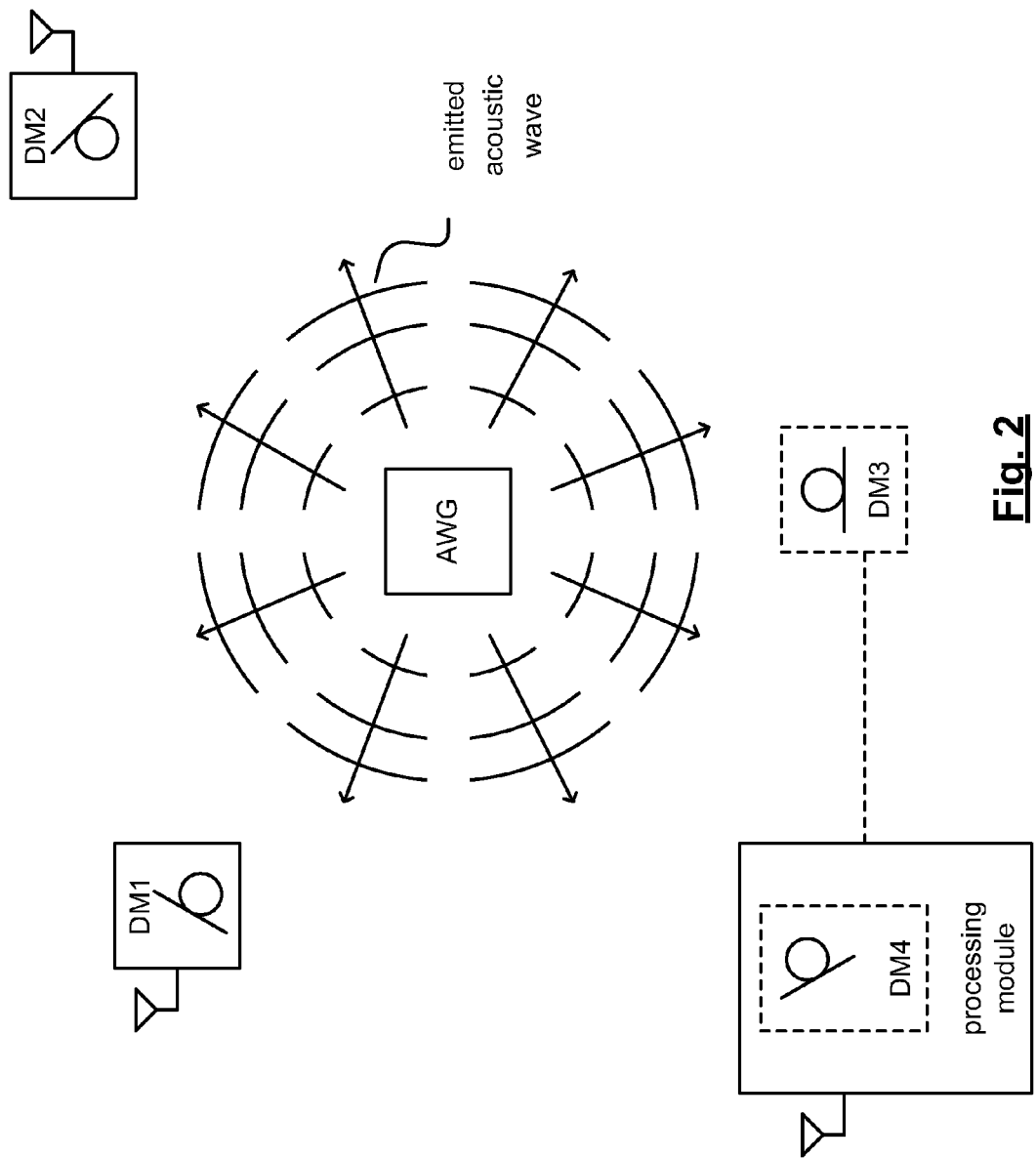
FIG. 2 is a diagram of an alternative embodiment an apparatus that performs position determination and/or movement tracking via acoustic wave detection by directional microphones.

FIG. 2 is a diagram of an alternative embodiment an apparatus that performs position determination and/or movement tracking via acoustic wave detection by directional microphones. This embodiment is somewhat analogous to the previous embodiment, with at least one difference being that the directional microphones are wirelessly coupled to the processing module. It is also noted that at least one directional microphone may be integrated into the processing module.

The wireless means by which communication is supported may be varied, and it may be supported using any desired radio frequency (RF) communication standard including any that operates in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Moreover when the use of RF communication is employed within such an apparatus, at least one of the directional microphones includes a first radio frequency (RF) transceiver, and the processing module includes a second RF transceiver. Based on an RF signal transmitted between the first RF transceiver and the second RF transceiver, the processing module can then determine a distance between the processing module and the directional microphone from which the RF signal was transmitted. By using a transmission time at which the RF signal is transmitted from a first device, and a receive time at which the RF signal is received by a second device, and also knowing the speed/velocity at which the RF signal travels, then the distance between the first device and the second device may be determined.

Figure 3:
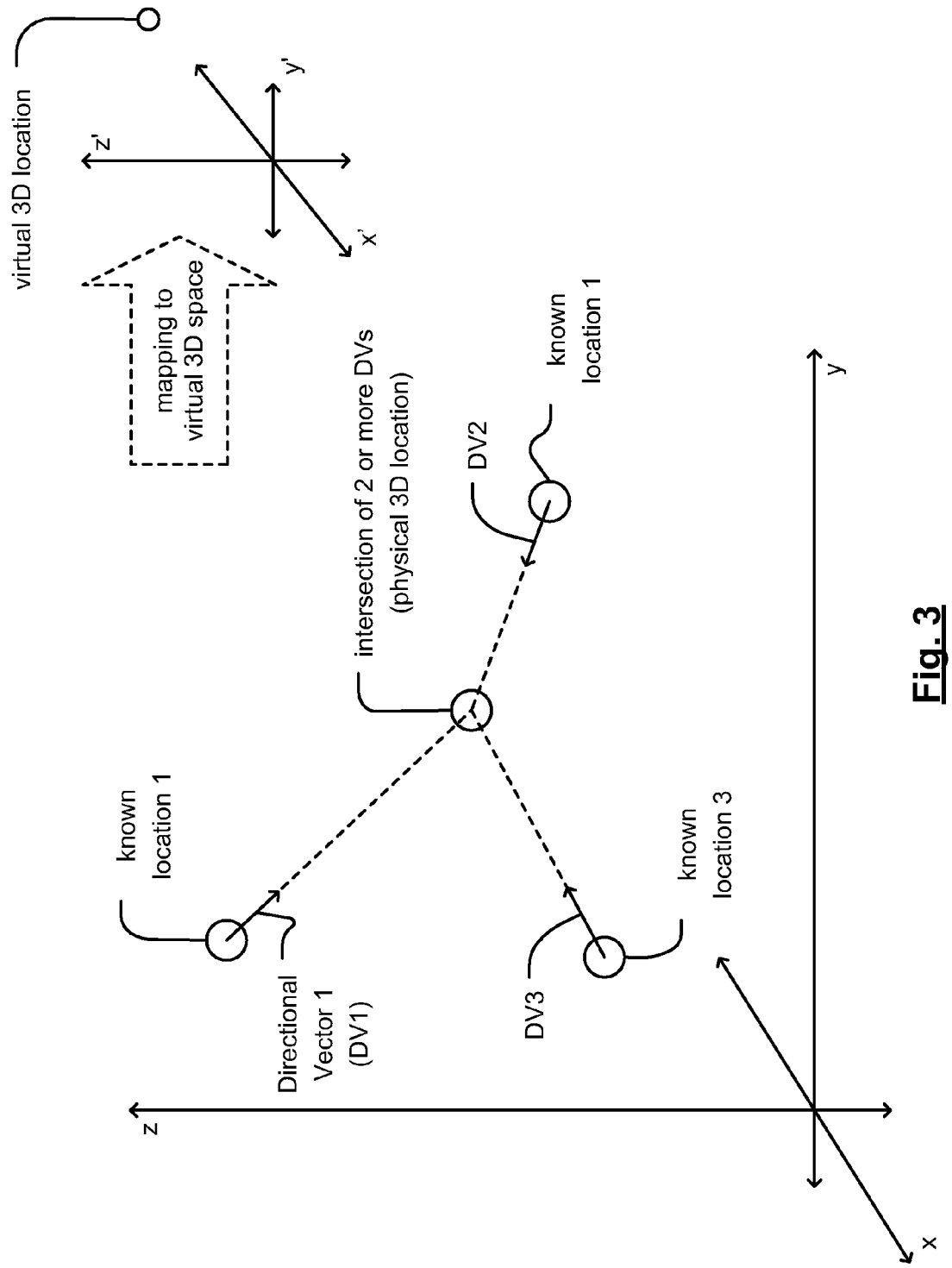
FIG. 3 is a diagram of an embodiment showing a means by which position of a point, object, etc. may be determined using multiple directional vectors extending from multiple known locations, respectively, to that point, object, etc.

FIG. 3 is a diagram of an embodiment showing a means by which position of a point, object, etc. may be determined using multiple directional vectors extending from multiple known locations, respectively, to that point, object, etc. This diagram depicts 3D space in a right handed, Cartesian coordinate system (e.g., shown as having axes xyz). Clearly, the principles described with respect to this diagram are applicable to any other 3D coordinate system as well.

When at least two positions are known, and when directional vectors extending from each of those two locations are known, then if those directional vectors do intersect at all, then the location of the intersection may be determined using triangulation. If additional known locations are known, and if additional directional vectors extending from those additional known locations are also known, then a greater certainty of an intersection between the various directional vectors may be had.

It is noted that once the position associated with the intersection of these directional vectors is known, then this position (or location) may be mapped to a virtual 3D coordinate system. The upper right hand corner of the diagram depicts a virtual 3D space in a right handed, Cartesian coordinate system (e.g., shown as having axes x'y'z').

FIG. 4A and FIG. 4B are diagrams of an embodiment of an apparatus that employs directional vectors associated with detecting relative maximum amplitudes of an acoustic waves to determine position of the source of the acoustic waves.

Referring to perspective of FIG. 4A, which is viewed in the xy plane of a 3D space having an xyz coordinate system, the principles of using triangulation may be employed when determining position of an acoustic wave generator whose emitted acoustic wave is detecting by various directional microphones. In this embodiment, three directional microphones are shown as detecting an acoustic wave emitted from an acoustic wave generator. The orientation of each directional microphone, when detecting a relative maximum amplitude of the acoustic wave. For example, a projection of a first directional vector (DV1 proj.) from a first directional microphone (DM1) extends from the first directional microphone to the acoustic wave generator. A projection of a second directional vector (DV2 proj.) from a second directional microphone (DM2) extends from the second directional microphone to the acoustic wave generator. Additional directional vectors, associated with additional directional microphones, may also be employed. The directional microphone orientations undergo processing in a processing module to determine the intersection of the various directional vectors. The intersection of these directional vectors is the location of the acoustic wave generator.

Referring to perspective of FIG. 4B, this diagram is viewed in the xz plane of a 3D space having an xyz coordinate system.

FIG. 5A and FIG. 5B are diagrams of an embodiment of an apparatus that employs directional vectors associated with detecting relative maximum amplitudes of an acoustic waves to determine position of the device that has detected the acoustic waves.

Referring to embodiment of FIG. 5A, which is viewed in the xy plane of a 3D space having an xyz coordinate system, the principles of using triangulation may be employed when determining position of a device that includes multiple directional microphones (e.g., a first directional microphone (DM1), a second directional microphone (DM2), etc.) that detects acoustic waves emitted from various acoustic wave generators (e.g., a first acoustic wave generator (AWG1), a second acoustic wave generator (AWG2), etc.).

The principles of triangulation are employed in this embodiment, but in reverse that the previous embodiment. The orientation of each directional microphone of the device, when detecting a relative maximum amplitude of a particular acoustic wave is determined.

For example, a projection of a first directional vector (DV1 proj.) extends from a first acoustic wave generator (AWG1) to a first directional microphone (DM1). A projection of a second directional vector (DV2 proj.) extends from a second acoustic wave generator (AWG2) to a second directional microphone (DM2). Additional directional vectors, associated with additional directional microphones and acoustic wave generators, may also be employed. The directional microphone orientations, and particularly their associated directional vectors, undergo processing in a processing module to determine the intersection of those various directional vectors. The intersection of these directional vectors is the location of the device that includes the multiple directional microphones.

Referring to embodiment of FIG. 5B, this diagram is viewed in the xz plane of a 3D space having an xyz coordinate system.

Figure 6A:
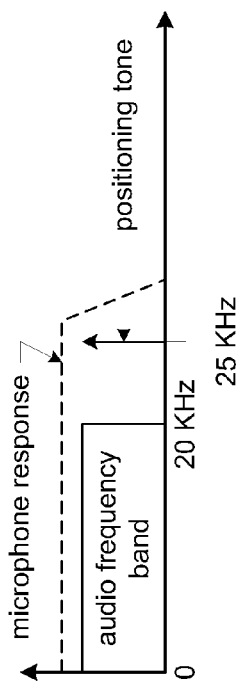
FIG. 6A is a diagram of an example of audio and near audio frequency bands.

FIG. 6A is a diagram of an example of audio and near audio frequency bands that may be used by any apparatus and/or system described herein. In this example, the audio frequency band and/or a positioning tone (e.g., a sinusoidal signal) having a frequency just above the audible frequency range (e.g., at 25-35 kHz) are within the bandwidth of the directional microphones implemented to detect the acoustic waves. Thus, the directional microphones may serve a dual purpose of capturing audio for normal game play, game set up, game authentication, player authentication, gaming object authentication, and of position determination and motion tracking. In an embodiment, the gaming object and/or the player may transmit a near audible signal (e.g., a tone at 25 kHz), which is above the audible frequency range, but with the band width (e.g., frequency response) of the directional microphones. The directional microphones may adjust their position to focus in on the source of the tone (e.g., using directionality sweeping that may be performed electrically and/or mechanically). The angular positioning and the intersection thereof may be used to determine the location of the source of the acoustic wave generator (e.g., such as a gaming object and/or the player).

FIG. 6B, FIG. 6C, FIG. 6D, and FIG. 6E are diagrams of some possible embodiments of physical configurations of directional microphones, including directional microphone arrays.

Figure 6E:
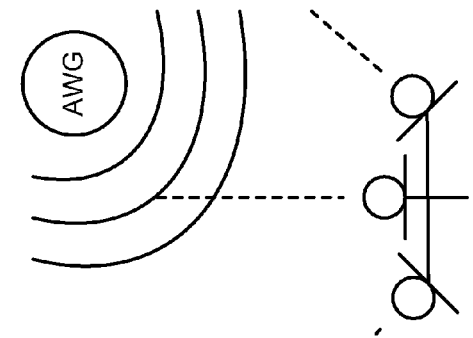
FIG. 6B, FIG. 6C, FIG. 6D, and FIG. 6E are diagrams of some possible embodiments of physical configurations of directional microphones, including directional microphone arrays.
Figure 6D:
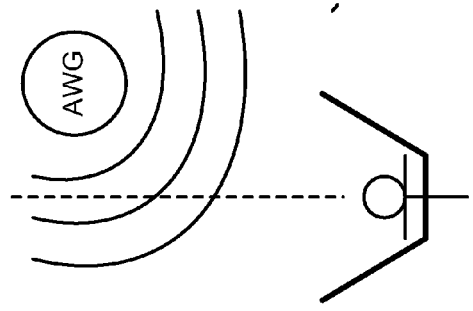
Figure 6C:
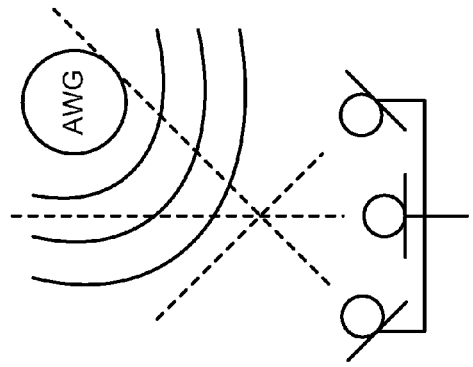
Figure 6B:
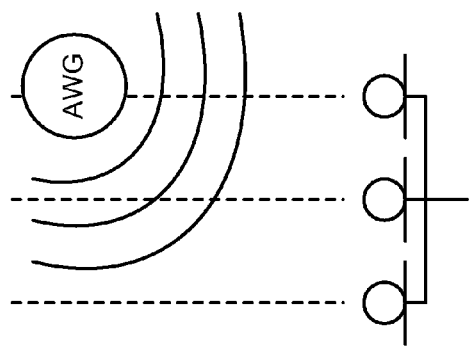

Referring to embodiment of FIG. 6B, a directional microphone array is shown as including multiple directional microphones aligned with one another such that their directionalities are parallel with one another. The directional microphone on the right hand side of the directional microphone array, which is more directly aligned to the acoustic wave generator, will therefore detect a larger relative amplitude of the acoustic wave emitted from the acoustic wave generator than the other directional microphones of the directional microphone array. Having such spatial diversity may allow for a greater precision in determining a directional vector associated with detecting a relative maximum amplitude of the acoustic wave.

Referring to embodiment of FIG. 6C, a directional microphone array is shown as including multiple directional microphones such that each such that their directionalities are in various directions. The angular difference in these directionalities may be different as desired in a particular application (e.g., 30 degrees, 45 degrees, etc.). In this embodiment, the directional microphone on the left hand side of the directional microphone array, which is more directly aligned to the acoustic wave generator, will therefore detect a larger relative amplitude of the acoustic wave emitted from the acoustic wave generator than the other directional microphones of the directional microphone array. The directional microphone in the middle of the directional microphone array will detect a second largest relative amplitude of the acoustic wave. The directional microphone on the right hand side of the directional microphone array has a directionality almost perpendicular to the direction from which the acoustic waves are emitted. By comparing the relative maximum amplitudes of the acoustic waves detected by the various directional microphones of a directional microphone array, a relatively high confidence of a directional vector associated with detecting a relative maximum amplitude of the acoustic wave by the directional microphone array may be determined.

Referring to embodiment of FIG. 6D, this diagram shows that a desired mechanical fixture may be employed in conjunction with a directional microphone as well. In this diagram, a mechanical fixture is employed to assist in the guiding of an acoustic wave to the directional microphone for detecting the acoustic wave. Any desired shape of such a mechanical fixture may be employed (e.g., a half-sphere, any desired parabolic shape, a cone, etc.) without departing from the scope and spirit of the invention. Also, such a mechanical fixture may be employed for a directional microphone array as well as for a singular directional microphone.

Referring to embodiment of FIG. 6E, a directional microphone array is shown as including multiple directional microphones such that each such that their directionalities again are in various directions. The angular difference in these directionalities may be different as desired in a particular application (e.g., 60 degrees, 90 degrees, etc.). In this embodiment, the directional microphone in the middle of the directional microphone array, which is more directly aligned to the acoustic wave generator, will therefore detect a larger relative amplitude of the acoustic wave emitted from the acoustic wave generator than the other directional microphones of the directional microphone array. The directional microphone on the right hand side of the directional microphone array will detect a second largest relative amplitude of the acoustic wave. The directional microphone on the left hand side of the directional microphone array has a directionality almost perpendicular to the direction from which the acoustic waves are emitted. By comparing the relative maximum amplitudes of the acoustic waves detected by the various directional microphones of a directional microphone array, a relatively high confidence of a directional vector associated with detecting a relative maximum amplitude of the acoustic wave by the directional microphone array may be determined.

Figure 7B:
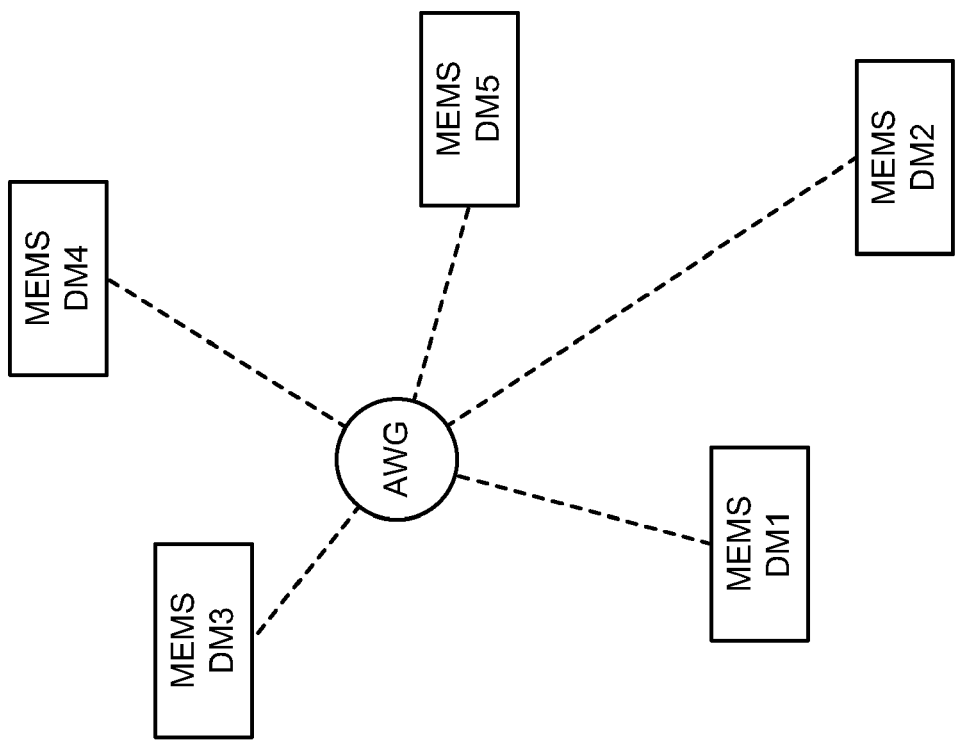
FIG. 7B is a diagram of an embodiment of multiple integrated circuits, such that each integrated circuit includes a MEMS microphone, for detecting acoustic waves.
Figure 7A:
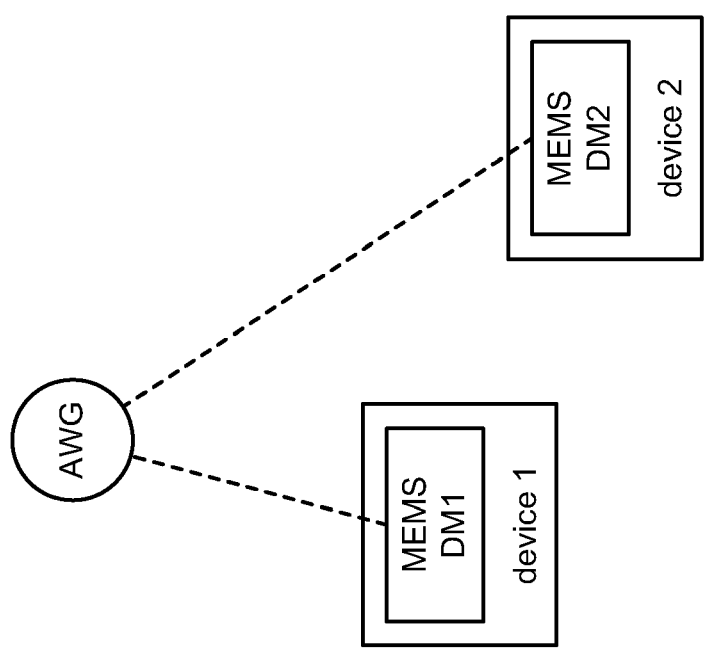
FIG. 7A is a diagram of an embodiment of multiple devices that include micro-electrical-mechanical system (MEMS) microphones for detecting acoustic waves.

FIG. 7A is a diagram of an embodiment of multiple devices that include micro-electrical-mechanical system (MEMS) microphones for detecting acoustic waves.

As also mentioned above with respect to other embodiments, it is also noted that the physical construction of the directional microphones may be that of a MEMS microphone. Again, a MEMS microphone is composed of a pressure sensitive diaphragm etched into an integrated circuit. This embodiment includes two separate devices that each include a corresponding MEMS directional microphone. The devices may be cell phones, other personal communication device, a handheld acoustic wave detection device, and/or generally any device that includes an integrated circuit therein such that a MEMS directional microphone may be implemented within the integrated circuit. Directional vectors associated with each of the MEMS directional microphones detecting a relative maximum amplitude of an acoustic wave emitted from the acoustic wave generator may be employed to determine the location of the acoustic wave generator (when locations of the device 1 and the device 2 are known).

FIG. 7B is a diagram of an embodiment of multiple integrated circuits, such that each integrated circuit includes a MEMS microphone, for detecting acoustic waves. This diagram shows how multiple MEMS directional microphones, implemented on various integrated circuits, may be distributed around a region. When locations of the various integrated circuits that include the MEMS directional microphones are known, then directional vectors associated with each of the MEMS directional microphones detecting a relative maximum amplitude of an acoustic wave emitted from the acoustic wave generator may be employed to determine the location of the acoustic wave generator.

Figure 8B:
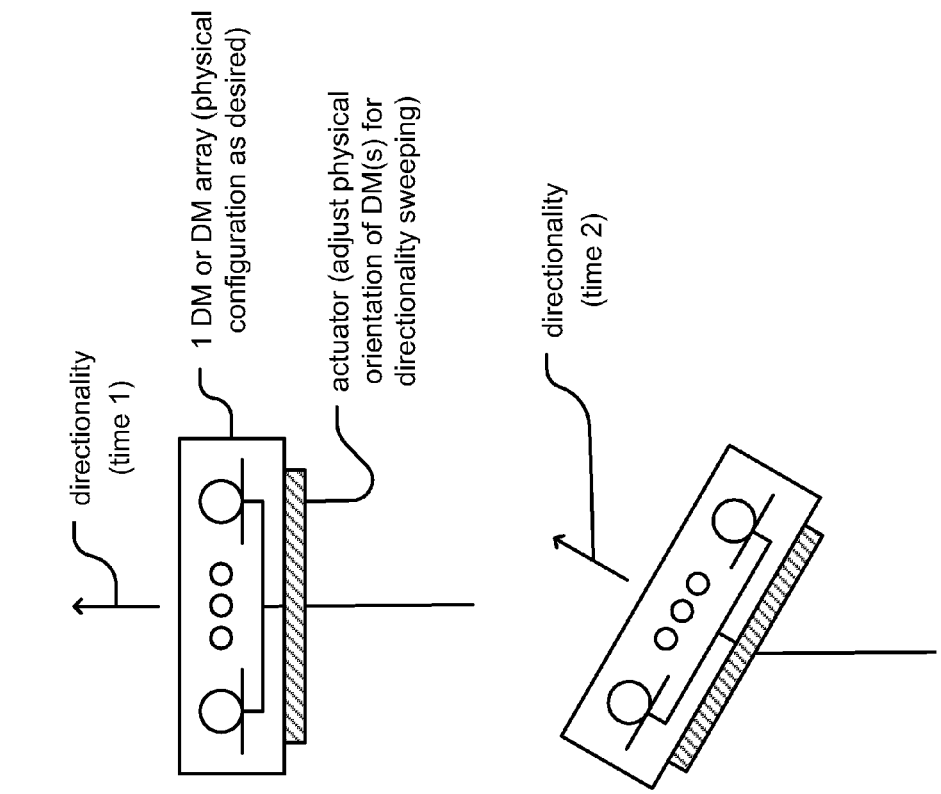
FIG. 8B is a diagram of an embodiment of mechanical sweeping of directionality of a directional microphone or directional microphone array.
Figure 8A:
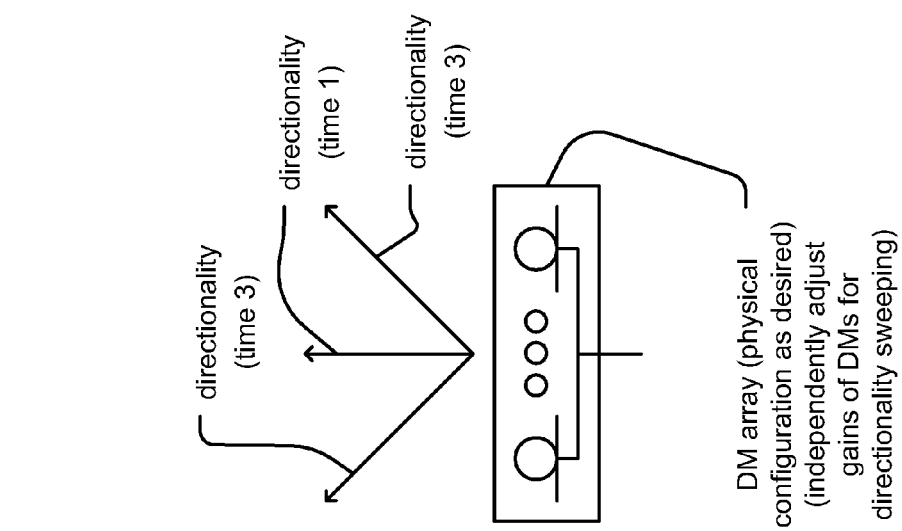
FIG. 8A is a diagram of an embodiment of electrical sweeping of directionality of a directional microphone or directional microphone array.

FIG. 8A is a diagram of an embodiment of electrical sweeping of directionality of a directional microphone or directional microphone array.

As also mentioned above, the determining of a directional vector associated with a particular directional microphone receiving a maximum amplitude of the acoustic wave may be determined in a variety of ways. For one example, this may be performed by sweeping a directionality of a directional microphone (or directional microphone array that includes multiple, co-located directional microphones) electrically. The physical configuration of the directional microphone (or directional microphone array) may be any desired physical configuration (e.g., including those depicted in FIGS. 6B-6E). When a directional microphone array is employed, or when a directional microphone having individually adjustable elements is employed, then the gains and/or frequency responses of those various directional microphones (or elements within a single directional microphone) may be modified electrically to sweep the directionality of the directional microphone in different directions.

This diagram shows how, while the physical configuration of the directional microphone is static, the directionality of the directional microphone (or directional microphone array) in fact varies as a function of time. When a relative maximum amplitude of an acoustic wave is detected, then information corresponding to the directionality of that directional microphone may be employed to determine a directional vector associated with detecting the relative maximum amplitude of the acoustic wave.

FIG. 8B is a diagram of an embodiment of mechanical sweeping of directionality of a directional microphone or directional microphone array. For another example of sweeping directionality, mechanical directionality sweeping may be performed using an actuator (e.g., integrated to the directional microphone (or directional microphone array) or on which the directional microphone (or directional microphone array) is mounted).

As with the previous embodiment, the physical configuration of the directional microphone (or directional microphone array) may be any desired physical configuration (e.g., including those depicted in FIGS. 6B-6E). When a directional microphone or directional microphone array is employed, then the physical orientation thereof may be adjusted using the actuator. The directionality of the directional microphone or directional microphone array is then changed as a function of the physical direction in which the directional microphone is oriented to receive acoustic waves.

It is noted that the physical orientation of individual directional microphones within a directional microphone array may also be independently adjustable. Moreover, a combination of electrical and mechanical directionality sweeping may be performed without departing from the scope and spirit of the invention.

Figure 9:
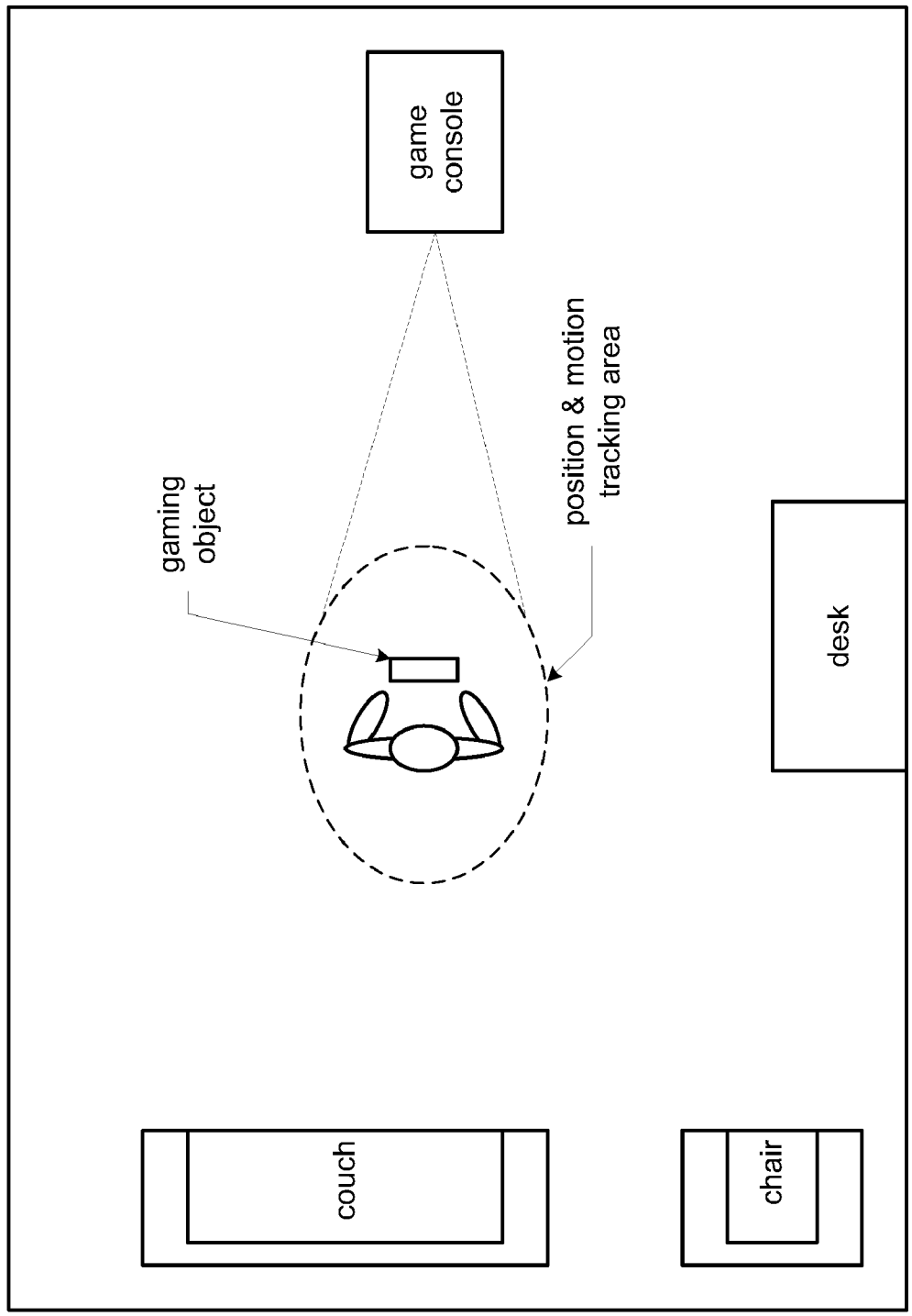
FIG. 9 is a schematic block diagram of an overhead view of an embodiment of a gaming system.

FIG. 9 is a schematic block diagram of an overhead view of an embodiment of a gaming system that includes a game console and a gaming object. The gaming system has an associated a physical area in which the game console and the gaming object are located. The physical area may be a room, portion of a room, and/or any other space where the gaming object and game console are proximally co-located (e.g., airport terminal, on a bus, on an airplane, etc.).

The gaming object may be a wireless game controller and/or any object used or worn by the player to facilitate play of a video game. For example, the gaming object may be a simulated sword, a simulated gun, a helmet, a vest, a hat, shoes, socks, pants, shorts, gloves, etc.

In this system, the game console determines the positioning of the gaming object within the physical area using one or more position determination techniques as subsequently discussed. Once the gaming object's position is determined, the game console tracks the motion of the gaming object using one or more motion tracking techniques as subsequently discussed to facilitate video game play. In this embodiment, the game console may determine the positioning of the gaming object within a positioning tolerance (e.g., within a meter) at a positioning update rate (e.g., once every second or once every few seconds) and tracks the motion within a motion tracking tolerance (e.g., within a few millimeters) at a motion tracking update rate (e.g., once every 10-100 milliseconds).

Figure 10:
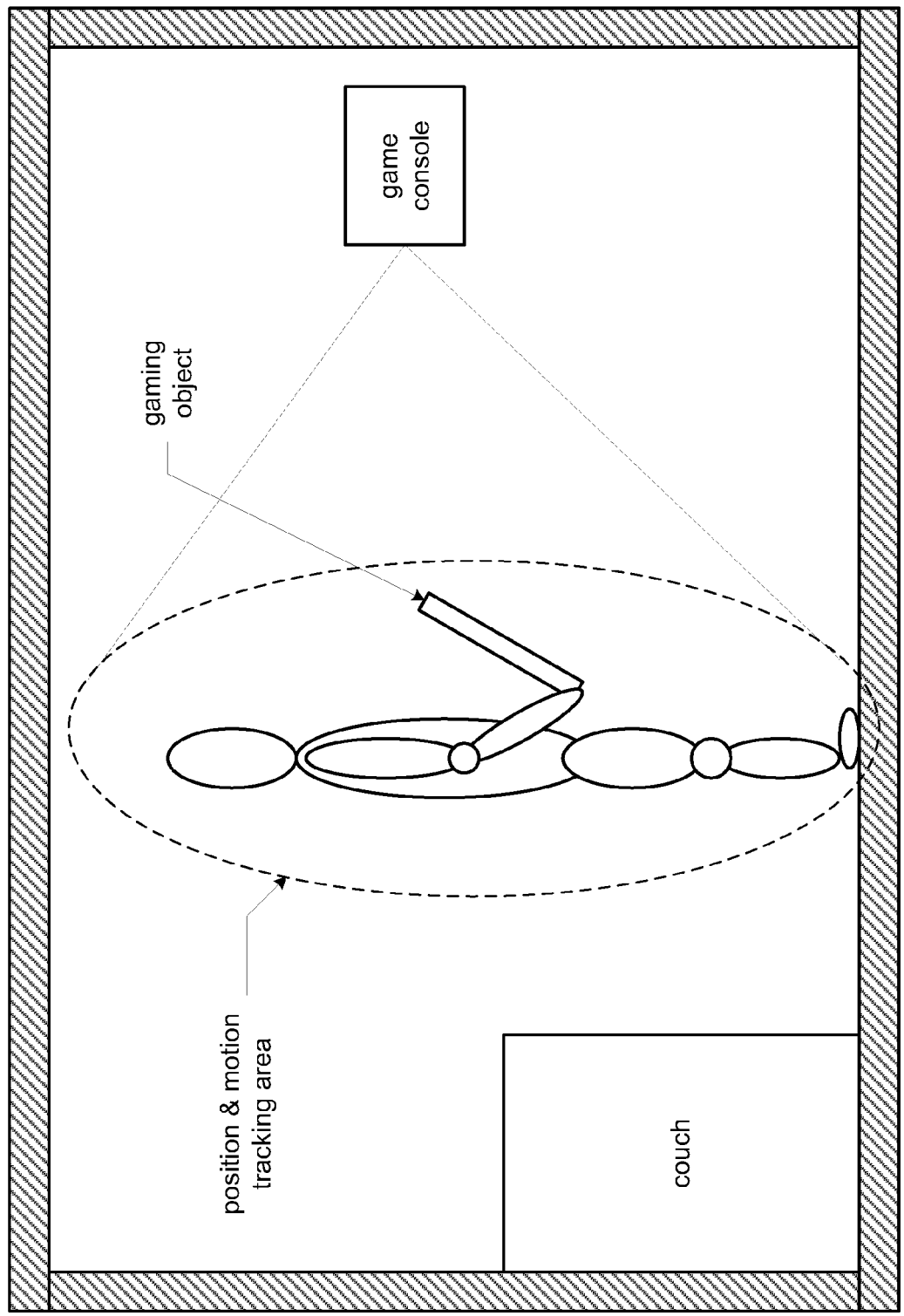
FIG. 10 is a schematic block diagram of a side view of an embodiment of a gaming system.

FIG. 10 is a schematic block diagram of a side view of an embodiment of a gaming system of FIG. 9 to illustrate that the positioning and motion tracking are done in three-dimensional space. As such, the gaming system provides accurate motion tracking of the gaming object, which may be used to map the player's movements to a graphics image for true interactive video game play.

FIG. 11 is a diagram illustrating an embodiment of a gaming system including a game console that determines a position of a source based on acoustic waves detected by multiple directional microphones that are wire-coupled to the game console.

In this embodiment, the source of the acoustic wave is an acoustic wave generator that is implemented on a player, a gaming object, and/or a game controller. For example, an acoustic wave generator may be integrated into a gaming object and/or game controller that is employed by a player when playing a game. Alternatively, the player himself or herself may be wearing an article of clothing that contains the acoustic wave generator. Moreover, any of the player, gaming object, and/or game controller may include multiple acoustic wave generators such that each individual acoustic wave generator may be detected independently to discern and discriminate the movement of different parts of the player, gaming object, and/or game controller.

A physical gaming environment (at least a portion of which may be represented within a virtual gaming environment) includes a number of directional microphones arranged at various locations therein to perform detection of acoustic waves emitted from the source (e.g., the acoustic wave generator which associate with the player, gaming object, and/or game controller). There may be some instances where the player has no gaming object (e.g., when simulating boxing), and the bodily position and/or movement of the player are those elements being monitored and/or tracked.

Each directional microphone has an associated directionality in which it can best detect acoustic waves. When a relative maximum amplitude of an acoustic wave is being detected, then there is a corresponding directional vector that may be viewed as extending from the directional microphone to the source (e.g., from the directional microphone to the acoustic wave generator). This directional vector may be determined in any number of ways including sweeping the directionality of the directional microphone (e.g., either mechanically, electrically, or both) across a range and then identifying the directionality in which the relative maximum amplitude of the acoustic wave is detected.

The game module (or another processing module) may then process the directional vectors associated with more than one directional microphone to determine a position of the source. For example, when multiple directional vectors are employed, then an intersection of them will correspond to the location of the source of the acoustic waves (e.g., the acoustic wave generator). Also, by comparing various directional vectors that are determined at different times (e.g., directional vectors a, b, etc. determined at time 1, directional vectors c, d, etc. determined taken at time 232 time (1+Δt)), then movement of the object within the physical gaming environment may be estimated.

Certain operational parameters of the directional microphones may also be adjusted by a user/player or in real time by control signals provided by the game console. For example, the gain, frequency response, directionality, etc. of the one or more directional microphones may be adjusted to based on any number of considerations including a predetermined setting within the game console, a player-selected setting within the game console (e.g., as selected by the player via a user interface), a type of game being played, a movement history of the player and/or gaming object, a current or expected movement of the player and/or gaming object, etc. Also, the any one of the directional microphones may include an integrated actuator to perform real-time re-positioning of a directional microphone to effectuate better detection of the acoustic wave, or sweeping across a range, to identify the relative maximum amplitude of the detected acoustic wave and there from determine its associated directional vector. Also, the directional microphone may be mounted on an actuator that can perform such re-positioning of the directional microphone. Clearly, a player/user can perform re-positioning of any directional microphone as well.

As can be seen in this embodiment, the directional microphones are all wire-coupled to the game console. Any desired wire-based communication protocol (e.g., Ethernet) may be employed to effectuate communication between the directional microphones and the game console to communicate information corresponding to the detected relative maximum amplitude of the acoustic wave. For example, the directional microphones may be 'smart' directional microphones that include a gyroscope, global positioning system (GPS) capability, and/or other location and/or orientation determining means, and information corresponding to the orientation of a particular directional microphone (e.g., its position and orientation, sometimes referred to as 'pose'). From such information, the directional vector associated with that directional microphone, when detecting the relative maximum amplitude of the acoustic wave, may then be determined.

Figure 12:
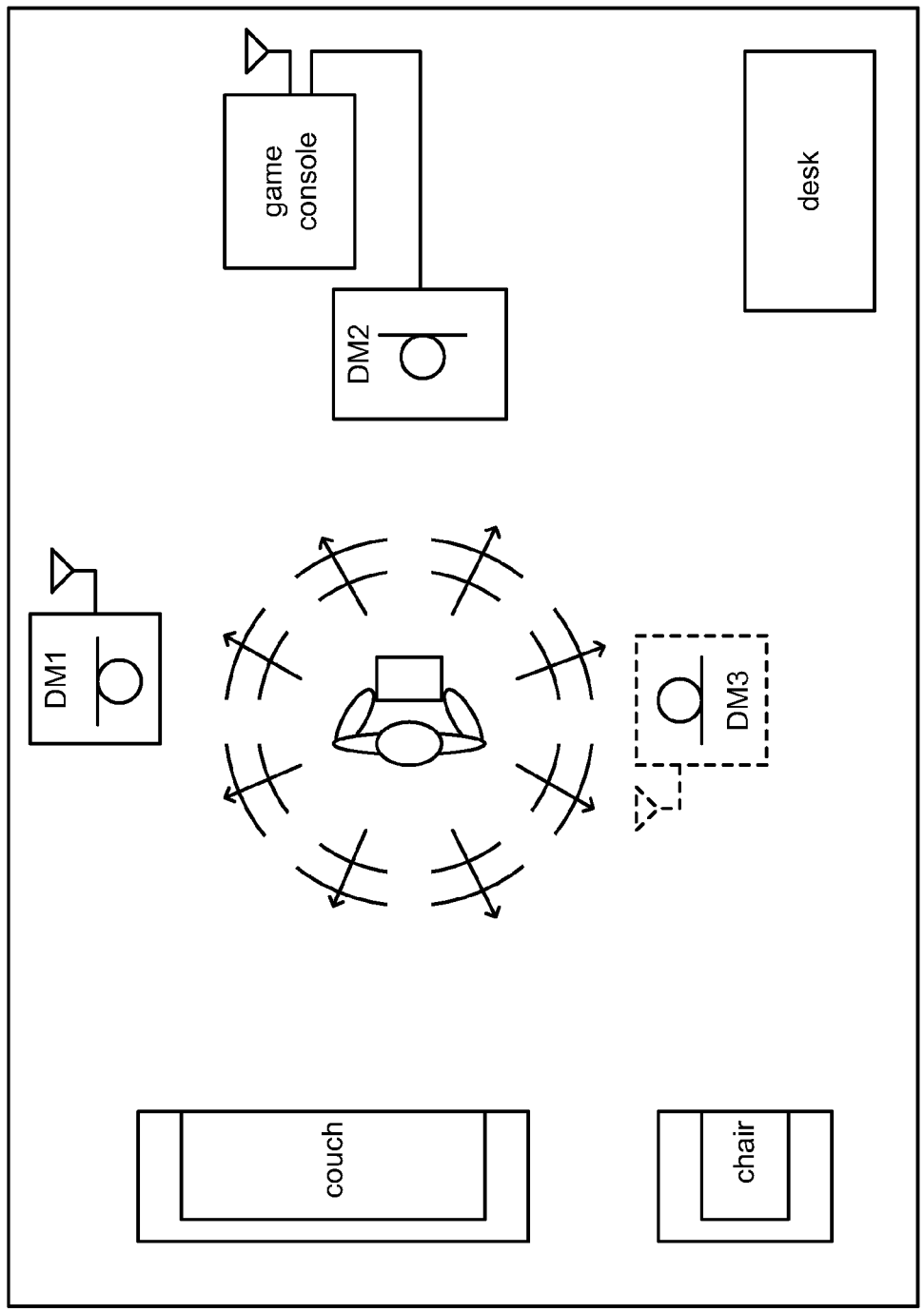
FIG. 12 is a diagram illustrating an alternative embodiment of a gaming system including a game console that determines a position of a source based on acoustic waves detected by multiple directional microphones such that at least one directional microphone is wirelessly to the game console.

FIG. 12 is a diagram illustrating an alternative embodiment of a gaming system including a game console that determines a position of a source based on acoustic waves detected by multiple directional microphones such that at least one directional microphone is wirelessly to the game console.

This embodiment is somewhat analogous to the previous embodiment, with at least one difference being that at least some of the directional microphones and the game console each include wireless communication capability to effectuate wireless communication there between. In this embodiment, at least one of the directional microphones is wire-coupled to the game console. For example, some of the directional microphones and the game console either includes an integrated wireless transceiver or is coupled to a wireless transceiver to effectuate communication between some of the directional microphones and the game console. In addition, a directional microphone may be integrated into the game console as well without departing from the scope and spirit of the invention.

This wireless communication can be supported using any number of desired wireless protocols including Code Division Multiple Access (CDMA) signaling, Time Division Multiple Access (TDMA) signaling, Frequency Division Multiple Access (FDMA) signaling, or some other desired wireless standard, protocol, or proprietary means of communication.

In addition, the wireless communication can be supported using any desired radio frequency (RF) communication standard including any that operates in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Figure 13:
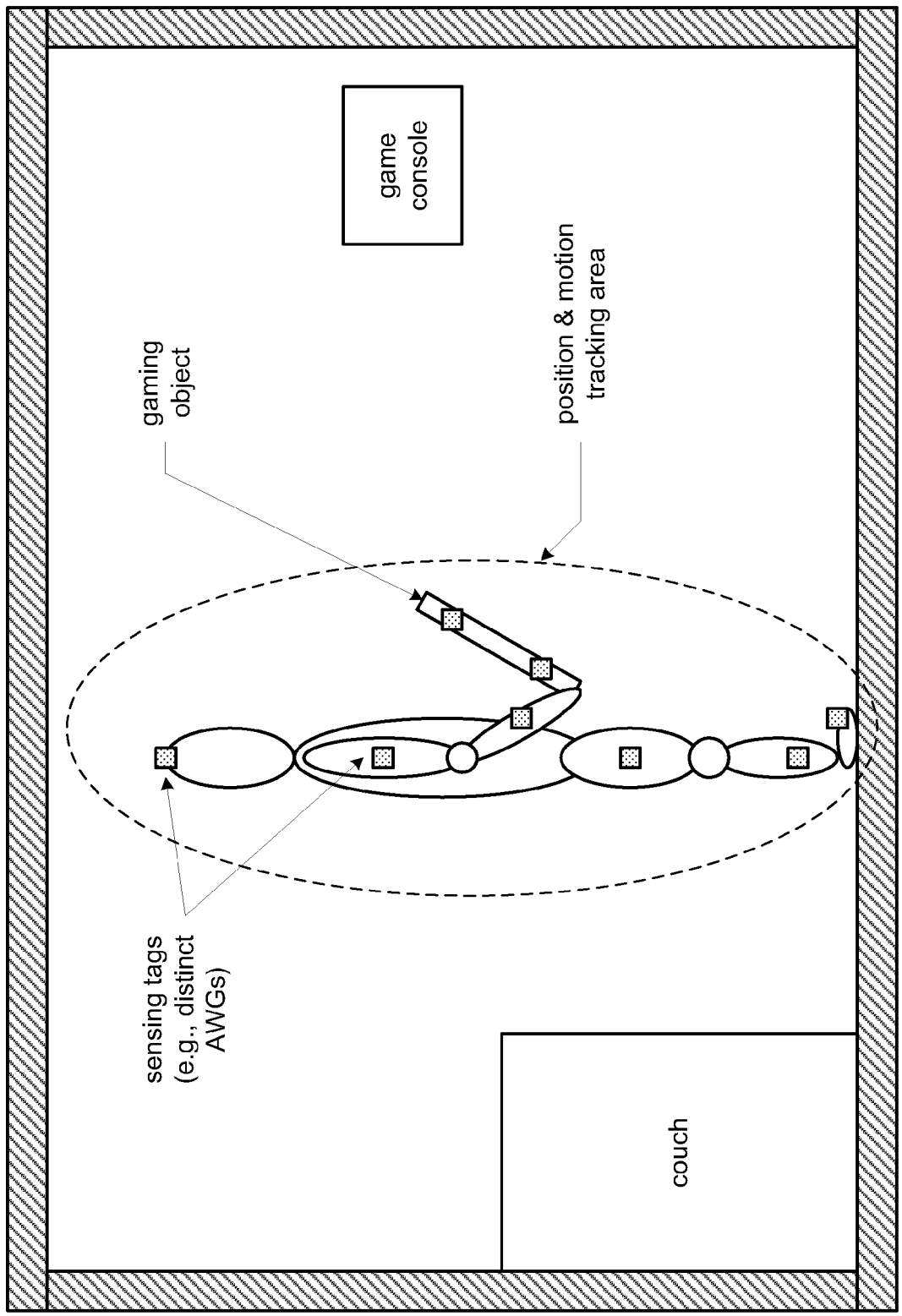
FIG. 13 is a schematic block diagram of a side view of another embodiment of a gaming system.

FIG. 13 is a schematic block diagram of a side view of another embodiment of a gaming system that includes multiple gaming objects, the player, and a game console. In this embodiment, the gaming objects include one or more sensing tags (e.g., metal, RFID tag, light reflective material, light absorbent material, a specific RGB [red, green, blue] color, etc.). For example, the gaming objects may include a game controller, a helmet, a shirt, pants, gloves, and socks, each of which includes one or more sensing tags. In this manner, the sensing tags facilitate the determining of position and/or facilitate motion tracking as will be subsequently discussed.

Figure 14:
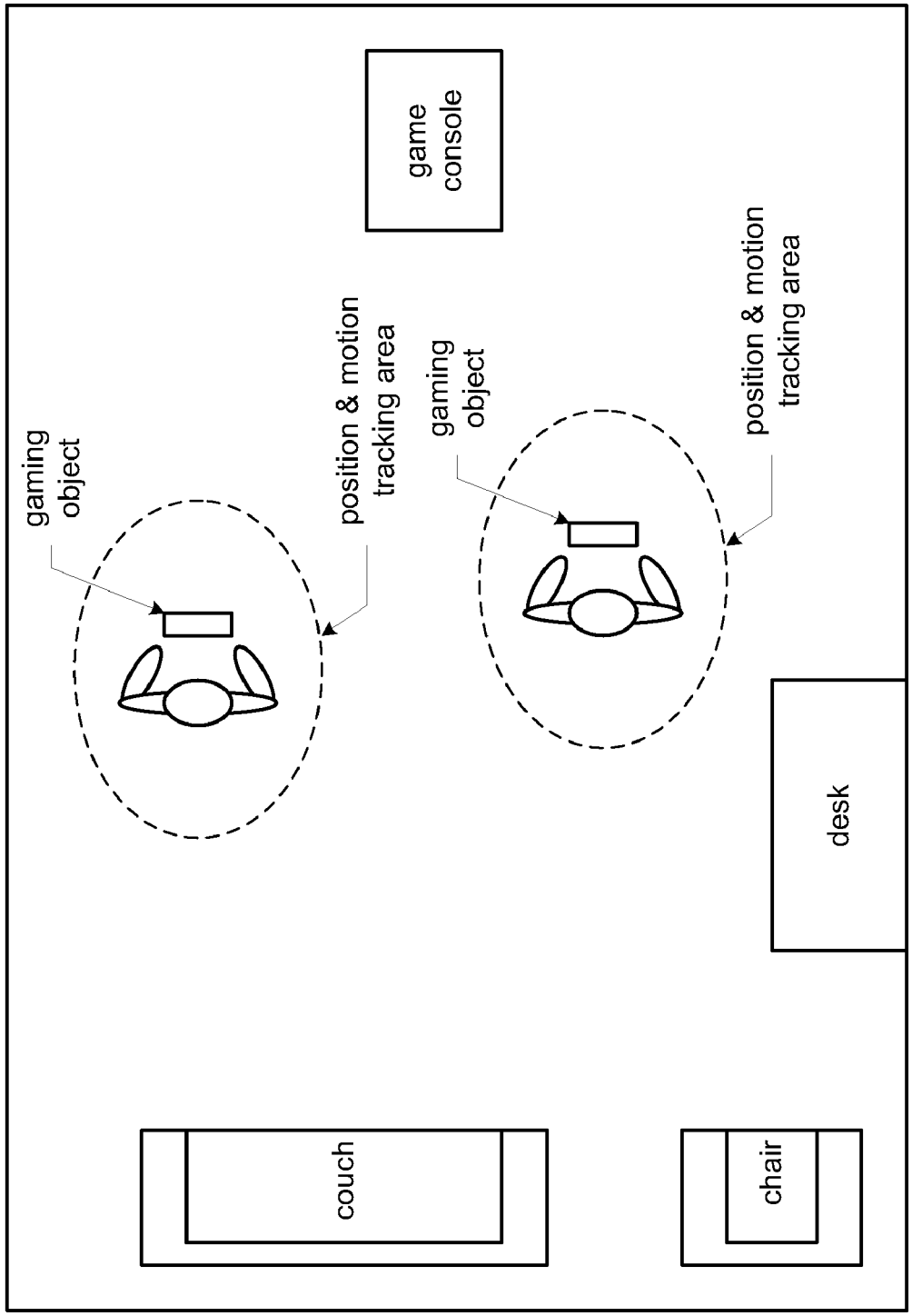
FIG. 14 is a schematic block diagram of an overhead view of another embodiment of a gaming system.

FIG. 14 is a schematic block diagram of an overhead view of another embodiment of a gaming system that includes a game console, a plurality of players and a plurality of gaming objects. In this instance, the positioning and motion tracking of each of the gaming objects (and hence the player) are determined by the game console and/or the one or more peripheral sensors.

FIG. 15, FIG. 16, and FIG. 17 are diagrams of an embodiment of a coordinate system of a localized physical area that may be used for a gaming system. In these diagrams, an xyz origin is selected to be somewhere in the localized physical area and each point being tracked and/or used for positioning on the player and/or on the gaming object is determined based on its Cartesian coordinates (e.g., x1, y1, z1). As the player and/or gaming object moves, the new position of the tracking and/or positioning points are determined in Cartesian coordinates with respect to the origin.

FIG. 18, FIG. 19, and FIG. 20 are diagrams of another embodiment of a coordinate system of a localized physical area that may be used for a gaming system. In these diagrams, an origin is selected to be somewhere in the localized physical area and each point being tracked and/or used for positioning on the player and/or on the gaming object is determined based on its vector, or spherical, coordinates ($\rho$, $\phi$, $\theta$), which are defined as: $\rho \geqq 0$ is the distance from the origin to a given point P. $0 \leqq \phi \leqq 180°$ is the angle between the positive z-axis and the line formed between the origin and P. $0 \leqq \theta \leqq 360°$ is the angle between the positive x-axis and the line from the origin to the P projected onto the xy-plane. $\phi$ is referred to as the zenith, colatitude or polar angle, while $\theta$ is referred to as the azimuth. $\phi$ and $\theta$ lose significance when $\rho=0$ and $\theta$ loses significance when $\sin(\phi)=0$ (at $\phi=0$ and $\phi=180°$). To plot a point from its spherical coordinates, go $\rho$ units from the origin along the positive z-axis, rotate $\phi$ about the y-axis in the direction of the positive x-axis and rotate $\theta$ about the z-axis in the direction of the positive y-axis. As the player and/or gaming object moves, the new position of the tracking and/or positioning points are determined in vector, or spherical, coordinates with respect to the origin.

While FIGS. 15-20 illustrate two types of coordinate system, any three-dimensional coordinate system may be used for tracking motion and/or establishing position within a gaming system.

Figure 21:
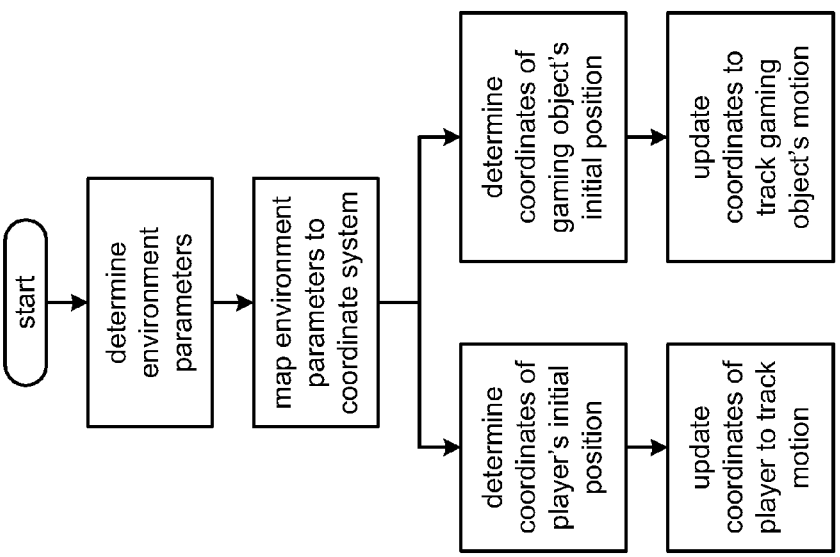
FIG. 21 is a diagram of a method for determining position and/or motion tracking.

FIG. 21 is a diagram of a method for determining position and/or motion tracking that begins by determining the environment parameters (e.g., determining the properties of the localized physical area such as height, width, depth, objects in the physical area, etc.). The method then continues by mapping the environment parameters to a coordinate system (e.g., Cartesian coordinate system of FIGS. 15-17). The method continues in one or more branches. Along one branch, the initial coordinates of the player are determined using one or more of a plurality of position determining techniques as described herein. This branch continues by updating the player's position to track the player's motion using one or more of a plurality of motion tracking techniques as described herein.

The other branch includes determining the coordinates of the gaming object's initial position using one or more of a plurality of position determining techniques as described herein. This branch continues by updating the gaming object's position to track the gaming object's motion using one or more of a plurality of motion tracking techniques as described herein. Note that the rate of tracking the motion of the player and/or gaming object may be done at a rate based on the video gaming being played and the expected speed of motion. Further note that a tracking rate of 10 milliseconds provides 0.1 mm accuracy in motion tracking.

Figure 22:
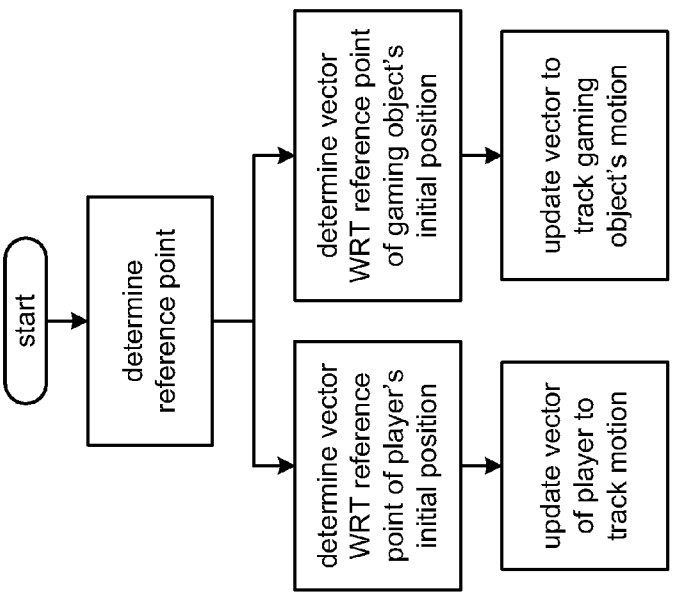
FIG. 22 is a diagram of another method for determining position and/or motion tracking.

FIG. 22 is a diagram of another method for determining position and/or motion tracking that begins by determining a reference point within a coordinate system (e.g., the vector coordinate system of FIGS. 18-20). The reference point may be the origin or any other point within the localized physical area. The method continues in one or more branches. Along one branch, a vector with respect to the reference point is determined to indicate the player's initial position, which may be done by using one or more of a plurality of position determining techniques as described herein. This branch continues by updating the player's position to track the player's motion using one or more of a plurality of motion tracking techniques as described herein.

The other branch includes determining a vector with respect to the reference point for the gaming object to establish its initial position, which may be done by using one or more of a plurality of position determining techniques as described herein. This branch continues by updating the gaming object's position to track the gaming object's motion using one or more of a plurality of motion tracking techniques as described herein. Note that the rate of tracking the motion of the player and/or gaming object may be done at a rate based on the video gaming being played and the expected speed of motion. Further note that a tracking rate of 10 milliseconds provides 0.1 mm accuracy in motion tracking.

FIG. 23, FIG. 24, and FIG. 25 are diagrams of another embodiment of a coordinate system of a localized physical area that may be used for a gaming system. In these diagrams, an xyz origin is selected to be somewhere in the localized physical area and the initial position of a point being tracked on the player and/or gaming object is determined based on its Cartesian coordinates (e.g., x1, y1, z1). As the player and/or gaming object moves, the new position of the tracking and/or positioning points are determined in Cartesian coordinates with respect to the preceding location (e.g., $\Delta x$, $\Delta y$, $\Delta z$).

As another example, the positioning and motion tracking of the player may be done with reference to the position of the gaming object, such the gaming objects position is determined with reference to the origin and/or its previous position and the position of the player is determine with reference to the gaming object's position. The reverse could be used as well. Further, both position and motion of the gaming object and the player may be referenced to a personal item of the player, such as a cell phone.

FIG. 26, FIG. 27, and FIG. 28 are diagrams of another embodiment of a coordinate system of a localized physical area that may be used for a gaming system. In these diagrams, an origin is selected to be somewhere in the localized physical area and the initial position of a point being tracked on the player and/or gaming object is determined based on its vector, or spherical coordinates (e.g., $\rho 1$, $\phi 1$, $\theta 1$). As the player and/or gaming object moves, the new position of the tracking and/or positioning points are determined as a vector, or spherical coordinates with respect to the preceding location (e.g., $\Delta V$, or $\Delta \rho$, $\Delta \phi$, $\Delta \theta$).

As another example, the positioning and motion tracking of the player may be done with reference to the position of the gaming object, such the gaming objects position is determined with reference to the origin and/or its previous position and the position of the player is determine with reference to the gaming object's position. The reverse could be used as well. Further, both position and motion of the gaming object and the player may be referenced to a personal item of the player, such as a cell phone.

Figure 29:
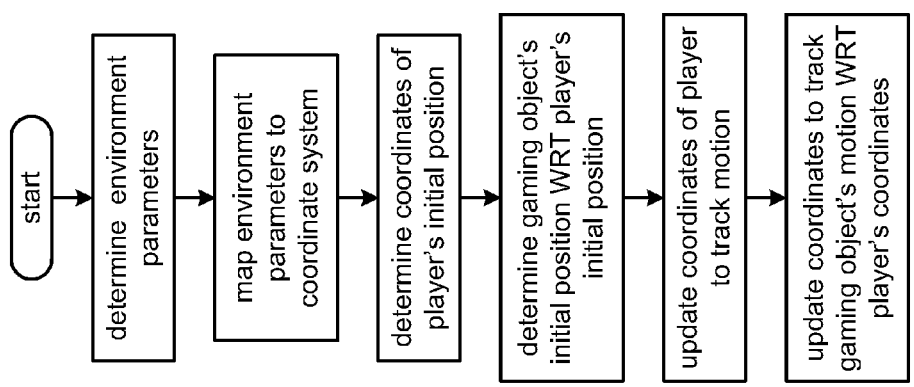
FIG. 29 is a diagram of another method for determining position and/or motion tracking.

FIG. 29 is a diagram of another method for determining position and/or motion tracking that begins by determining environment parameters of the physical area in which the gaming object lays and/or in which the game system lays. The environmental parameters include, but are not limited to, height, width, and depth of the localized physical area, objects in the physical area, differing materials in the physical area, multiple path effects, interferers, etc.

The method then proceeds by mapping the environment parameters to a coordinate system (e.g., one of the systems shown in FIGS. 15-17). As an example, if the physical area is a room, a point in the room is selected as the origin and the coordinate system is applied to at least some of the room. In addition, objects in the room (e.g., a couch, a chair, etc.) are mapped to the coordinate system based on their physical location in the room.

The method then proceeds by determining the coordinates of the player's, or players', position in the physical area. The method then continues by determining the coordinates of a gaming object's initial position. Note that the positioning of the gaming object may be used to determine the position of the player(s) if the gaming object is something worn by the player or is close proximity to the player. Alternatively, the initial position of the player may be used to determine the initial position of the gaming object. Note that one or more of the plurality of positioning techniques described herein may be used to determine the position of the player and/or of the gaming object.

The method then proceeds by updating the coordinates of the player's, or players', position in the physical area to track the player's motion. The method also continues by updating the coordinates of a gaming object's position to track its motion. Note that the motion of the gaming object may be used to determine the motion of the player(s) if the gaming object is something worn by the player or is close proximity to the player. Alternatively, the motion of the player may be used to determine the motion of the gaming object. Note that one or more of the plurality of motion techniques described herein may be used to determine the position of the player and/or of the gaming object.

Figure 30:
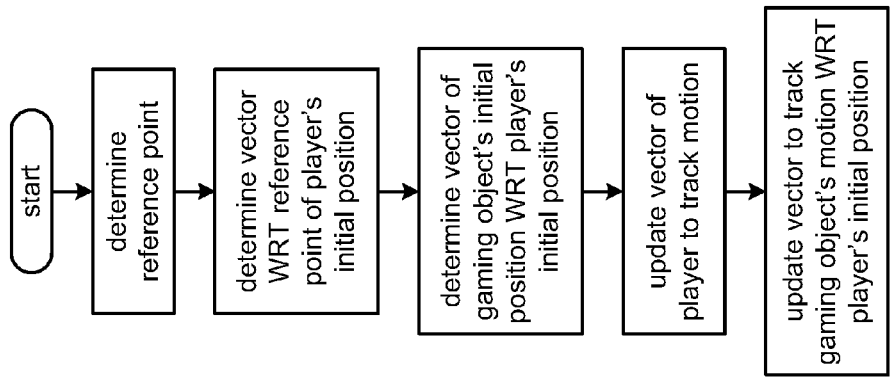
FIG. 30 is a diagram of another method for determining position and/or motion tracking.

FIG. 30 is a diagram of another method for determining position and/or motion tracking that begins by determining a reference point within the physical area in which the gaming object lays and/or in which the game system lays. The method then proceeds by determining a vector for a player's initial position with respect to a reference point of a coordinate system (e.g., one of the systems shown in FIGS. 18-20). As an example, if the physical area is a room, a point in the room is selected as the origin and the coordinate system is applied to at least some of the room.

The method then continues by determining a vector of a gaming object's initial position. Note that the positioning of the gaming object may be used to determine the position of the player(s) if the gaming object is something worn by the player or is close proximity to the player. Alternatively, the initial position of the player may be used to determine the initial position of the gaming object. Note that one or more of the plurality of positioning techniques described herein may be used to determine the position of the player and/or of the gaming object.

The method then proceeds by updating the vector of the player's, or players', position in the physical area to track the player's motion. The method also continues by updating the vector of the gaming object's position to track its motion. Note that the motion of the gaming object may be used to determine the motion of the player(s) if the gaming object is something worn by the player or is close proximity to the player. Alternatively, the motion of the player may be used to determine the motion of the gaming object. Note that one or more of the plurality of motion techniques described herein may be used to determine the position of the player and/or of the gaming object.

Figure 31:
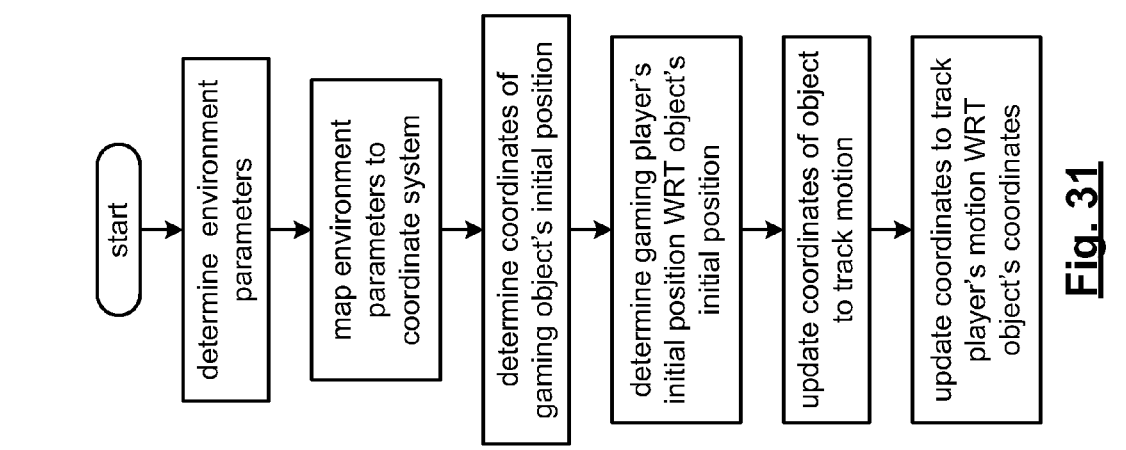
FIG. 31 is a diagram of another method for determining position and/or motion tracking.

FIG. 31 is a diagram of another method for determining position and/or motion tracking that begins by determining environment parameters of the physical area in which the gaming object lays and/or in which the game system lays. The environmental parameters include, but are not limited to, height, width, and depth of the localized physical area, objects in the physical area, differing materials in the physical area, multiple path effects, interferers, etc.

The method then proceeds by mapping the environment parameters to a coordinate system (e.g., one of the systems shown in FIGS. 23-25). As an example, if the physical area is a room, a point in the room is selected as the origin and the coordinate system is applied to at least some of the room. In addition, objects in the room (e.g., a couch, a chair, etc.) are mapped to the coordinate system based on their physical location in the room.

The method then proceeds by determining the coordinates of the gaming object's initial position in the physical area. The method then continues by determining the coordinates of the player's initial position with respect to the gaming object's initial position. Note that one or more of the plurality of positioning techniques described herein may be used to determine the position of the player and/or of the gaming object.

The method then proceeds by updating the coordinates of the gaming object's position in the physical area to track its motion. The method also continues by updating the coordinates of the player's position to track the player's motion with respect to the gaming object. Note that one or more of the plurality of motion techniques described herein may be used to determine the position of the player and/or of the gaming object.

Figure 32:
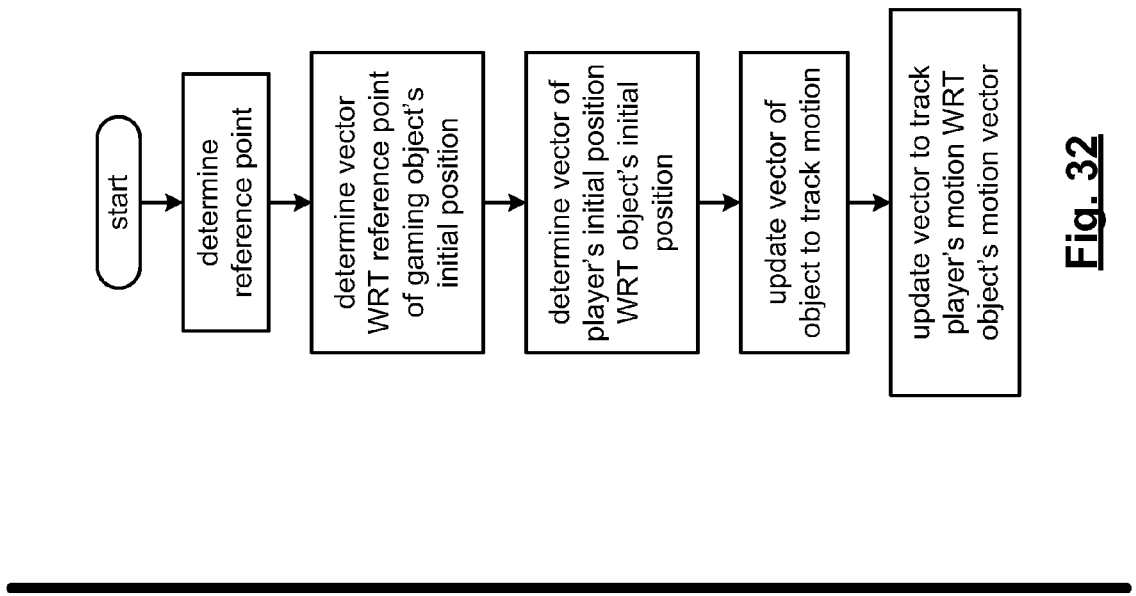
FIG. 32 is a diagram of another method for determining position and/or motion tracking.

FIG. 32 is a diagram of another method for determining position and/or motion tracking that begins by determining a reference point within the physical area in which the gaming object lays and/or in which the game system lays. The method then proceeds by determining a vector for a gaming object's initial position with respect to a reference point of a coordinate system (e.g., one of the systems shown in FIGS. 26-28). As an example, if the physical area is a room, a point in the room is selected as the origin and the coordinate system is applied to at least some of the room.

The method then continues by determining a vector of the player's initial position with respect to the gaming object's initial position. Note that one or more of the plurality of positioning techniques described herein may be used to determine the position of the player and/or of the gaming object.

The method then proceeds by updating the vector of the gaming object's position in the physical area to track its motion. The method also continues by updating the vector of the player's position with respect to the gaming object's motion to track the player's motion. Note that one or more of the plurality of motion techniques described herein may be used to determine the position of the player and/or of the gaming object.

Figure 33:
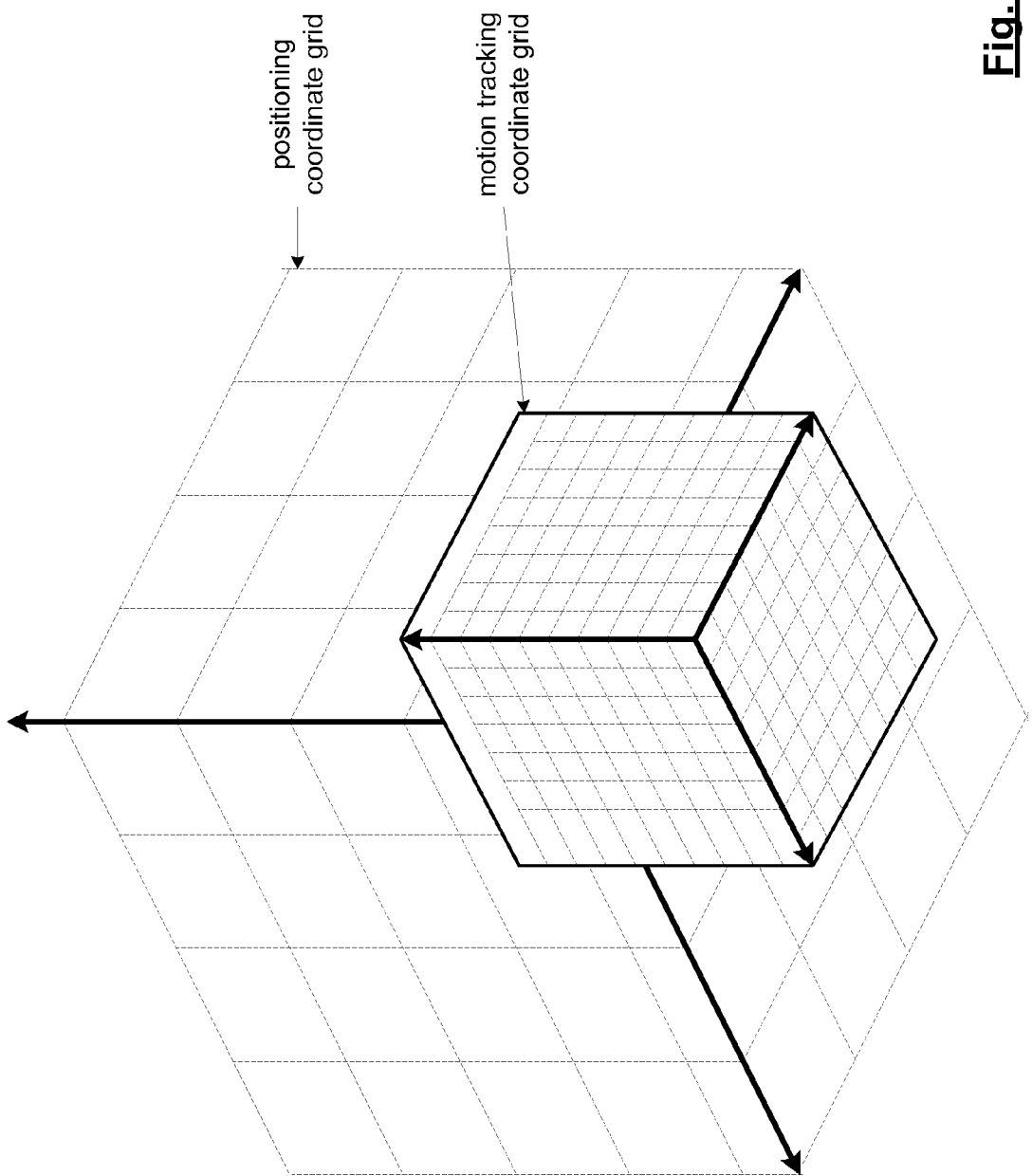
FIG. 33 is a diagram of another embodiment of a coordinate system of a gaming system.

FIG. 33 is a diagram of another embodiment of a coordinate system of a gaming system that is an extension of the coordinate systems discussed above. In this embodiment, the coordinate system includes a positioning coordinate grid and a motion tracking grid, where the motion tracking grid is of a finer resolution than the positioning coordinate grid. In general, the player or gaming object's position within the physical area can have a first tolerance (e.g., within a meter) and the motion tracking of the player and/or the gaming object has a second tolerance (e.g., within a few millimeters). As such, the position of the player and/or gaming object can be updated infrequently in comparison to the updating of the motion (e.g., the position can be updated once every second or so while the motion may be updated once every 10 milliseconds).

FIG. 34 is a diagram of a method for determining motion of a gaming object and/or a player that begins by determining an initial position of the player and/or gaming object using one or more of the positioning techniques described herein. The method continues by determining motion reference points for the player and/or for the gaming object as shown in FIG. 35. The reference points may be sensors on the player and/or on the gaming object, may be particular body parts (e.g., nose, elbow, knee, etc.), particular points on the gaming object, and/or a combination thereof. The number of reference points and the location thereof may be dependent on the video game, on the player's physical characteristics, on the player's skill level, on the desired motion tracking resolution, and/or on the motion tracking technique being used.

The method continues by determining initial motion coordinates for each reference point using one or more the position determining techniques and/or motion tracking techniques described herein. The method continues by establishing one or more data rates for the reference points based on the location of the reference point, motion patterns (e.g., a video bowling game, the player will have particular motions for bowling), previous motion (e.g., half way through bowling a ball, know where the next motion is likely to be), and/or human bio-mechanics (e.g., arms and legs bends in a certain manner). For example, the reference point of a hand may have a faster data rate than a reference point on the head since the hand will most likely being moving faster and more often than the head.

The method continues by obtaining motion tracking data (e.g., distances, vectors, distance changes, vector changes, etc.) for the reference points at intervals of the one or more data rates. The method continues by determining motion of the reference points based on the motion tracking date at intervals of the one or more data rates.

FIG. 36, FIG. 37, FIG. 38, and FIG. 39 are diagrams of examples of motion patterns in accordance with human bio-mechanics. As shown in FIG. 36, a head can move up/down, it can tilt, it can rotate, and/or a combination thereof. For a given video game, head motion can be anticipated based on current play of the game. For example, during an approach shot, the head will be relatively steady with respect to tilting and rotating, and may move up or down along with the body.

FIG. 37 shows the motion patterns of an arm (or leg) in accordance with human bio-mechanics. As shown, the arm (or leg) may contract or extend, go up or down, move side to side, rotate, or a combination thereof. For a given video game, an arm (or leg) motion can be anticipated based on the current play of the game. Note that the arm (or leg) may be broken down in smaller body parts (e.g., upper arm, elbow, forearm, wrist, hand, fingers). Further note that the gaming object's motion will be similar to the body part it is associated with.

FIG. 38 illustrates the likely motions of a torso, which can move up/down, side to side, front to back, and/or a combination thereof. For a given video game, torso motion can be anticipated based on current play of the game. As such, based on the human bio-mechanical limitations and ranges of motion along with the video game being player, the motion of the player and/or the associated gaming object may be anticipated, which facilitates better motion tracking.

FIG. 39 is a diagram of an example of motion estimation for the head, right arm, left arm, torso, right leg, and left leg of a video game player. In this game, it is anticipated that the arms will move the most often and over the most distance, followed by the legs, torso, and head. In this example the interval rate may be 10 milliseconds, which provides a 1 mm resolution for an object moving at 200 miles per hour. In this example, the body parts are not anticipated to move at or near 200 mph.

At interval 1, at least some of the reference points on the corresponding body parts is sampled. Note that each body part may include one or more reference points. Since the arms are anticipated to move the most and/or over the greatest distances, the reference point(s) associated with the arms are sampled once every third interval (e.g., interval 1, 4, 7). For intervals 2 and 3, the motion of the reference points is estimated based on the samples of intervals 1 and 4 (and may be more samples at different intervals), the motion pattern of the arm, human bio-mechanics, and/or a combination thereof. The estimation may be a linear estimation, a most likely estimation, and/or any other mathematical technique for estimating data points between two or more samples. A similar estimation is made for intervals 5 and 6.

The legs have a data rate of sampling once every four intervals (e.g., intervals 1, 5, 9, etc.). The motion data for the intervening intervals is estimated in a similar manner as the motion data of the arms was estimated. The torso has a data rate of sampling once every five samples (e.g., interval 1, 6, 11, etc.). The head has a data rate of sampling once every six samples (e.g., interval 1, 7, 13, etc.). Note that the initial sampling does not need to be done during the same interval for all of the reference points.

Figure 41:
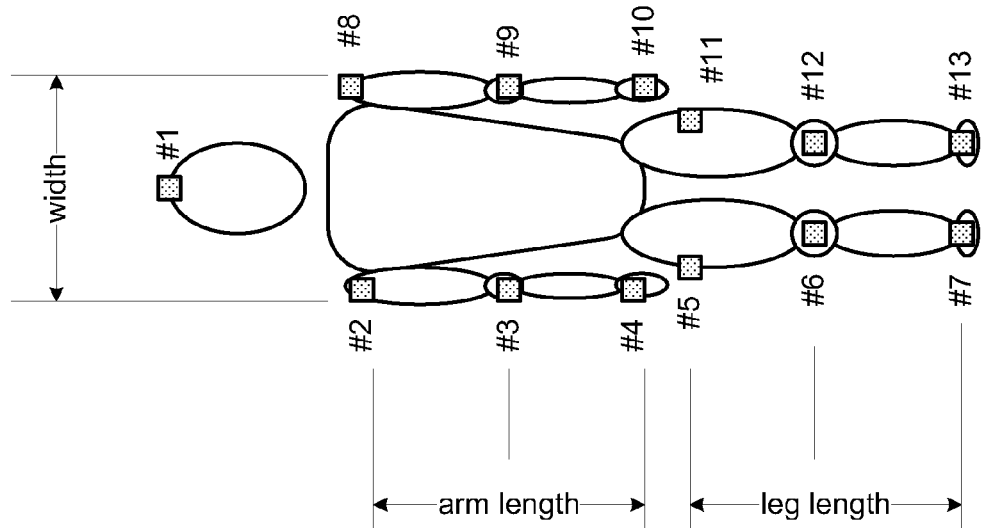
FIG. 40 and FIG. 41 are diagrams of examples of reference points on a player to determine player's physical measurements.
Figure 40:
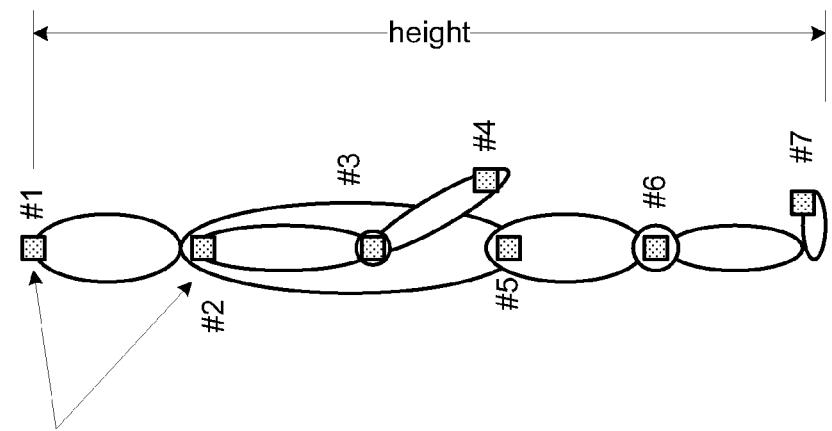

FIG. 40 and FIG. 41 are diagrams of examples of reference points on a player to determine player's physical measurements. In this example, once the positioning of the reference points is determined, their positioning may be used to determine the physical attributes of the player (e.g., height, width, arm length, leg length, shoe size, etc.).

Figure 42:
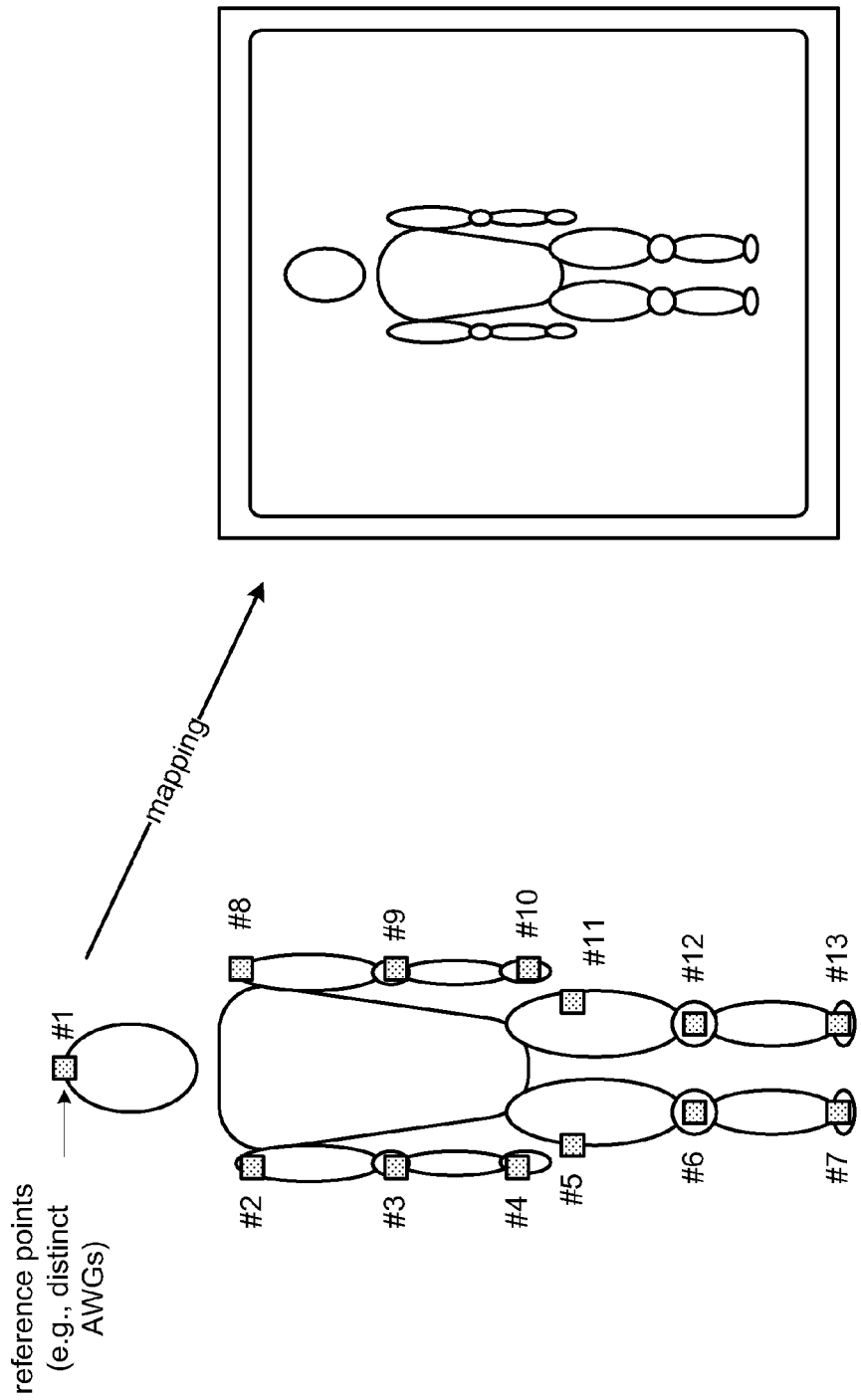
FIG. 42 is a diagram of an example of mapping a player to an image.

FIG. 42 is a diagram of an example of mapping a player to an image of the video game. In this embodiment, the image displayed in the video game corresponds to the player such that, as the player moves, the image moves the same way. The image may a stored image of the actual player, a celebrity player (e.g., a professional athlete), a default image, and/or a user created image. The mapping involves estimating motion of the non-reference points of the player based on the reference points of the player. In addition, the mapping involves equating the reference points on the player to the same points on the image. The same may be done for the gaming object.

Figure 43:
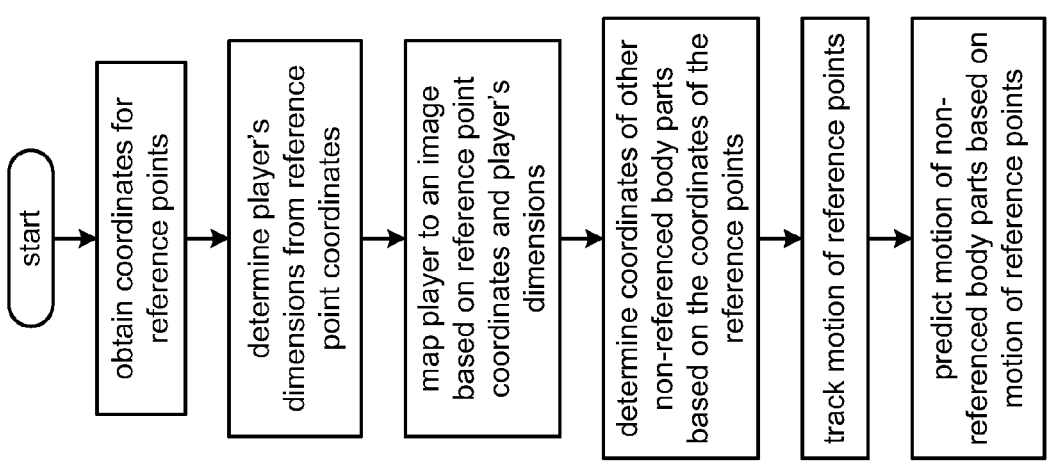
FIG. 43 is a diagram of another method for determining motion.

FIG. 43 is a diagram of another method for determining motion that begins by obtaining coordinates for the reference points of the player and/or gaming object. The method continues by determining the player's dimensions and/or determining the dimensions of the gaming object. The method continues by mapping the reference points of the player to corresponding points of a video image based on the player's dimensions. This step may also include mapping the reference points of the gaming object (e.g., a sword) to the corresponding image of the gaming object based on the gaming object's dimensions.

The method continues by determining coordinates of other non-referenced body parts and/or parts of the gaming object based on the coordinates of the reference points. This may be done by a linear interpolation, by a most likely motion algorithm, by a look up table, and/or any other method for estimated data points from surrounding data points. The method continues by tracking motion of the reference points and predicting motion of the non-referenced body parts and/or parts of the gaming object based on the motion of the reference points. This may also be done by a linear interpolation, by a most likely motion algorithm, by a look up table, and/or any other method for estimated data points from surrounding data points.

Figure 44:
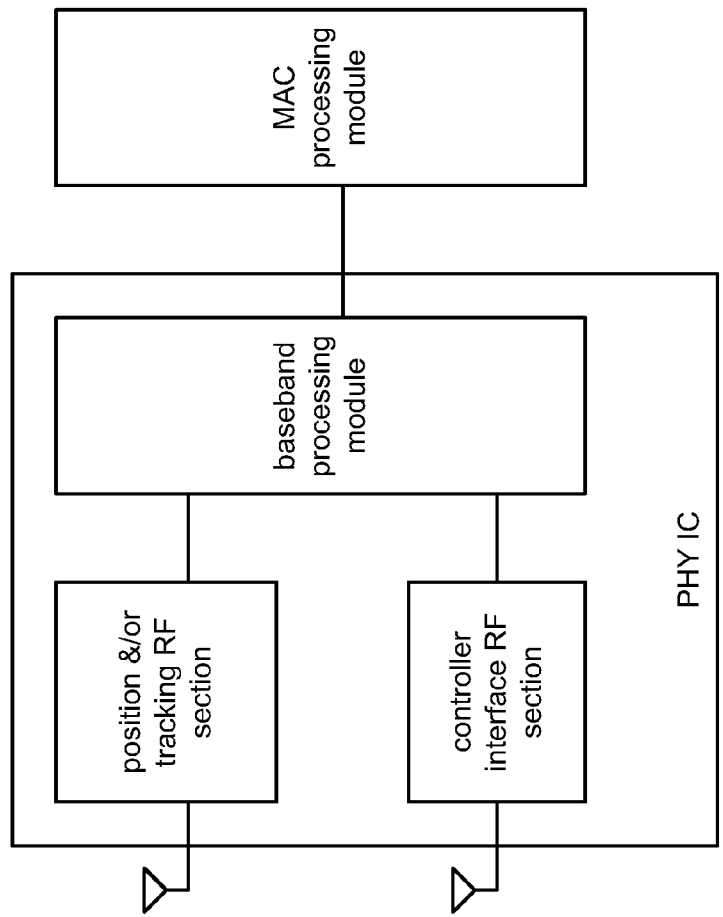
FIG. 44 is a schematic block diagram of an embodiment of a gaming object and/or game console.

FIG. 44 is a schematic block diagram of an embodiment of a gaming object and/or game console that includes a physical layer (PHY) integrated circuit (IC) and a medium access control (MAC) layer processing module. The PHY IC includes a position and/or motion tracking RF section, a controller interface RF section, and a baseband processing module. As like any processing module disclosed herein, the MAC processing module and the baseband processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in the various Figures depicted and described herein.

The MAC processing module triggers position and/or tracking data collection, formatting of the data, processing of the data, and/or controlling position and/or tracking data communications and/or controller communications. The position and/or tracking RF section may include circuitry to transmit one or more beamformed RF signals, RF signals for 3D antenna reception, RFID communications, and/or any other RF transmission and/or reception discussed herein.

The game console may use a standardized protocol, a proprietary protocol, and/or a combination thereof to provide the communication between the gaming object and the console. Note that the communication protocol may borrow unused bandwidth from a standardized protocol to facilitate the gaming communication (e.g., utilize unused BW of a WLAN, cell phone, etc.).

Figure 45:
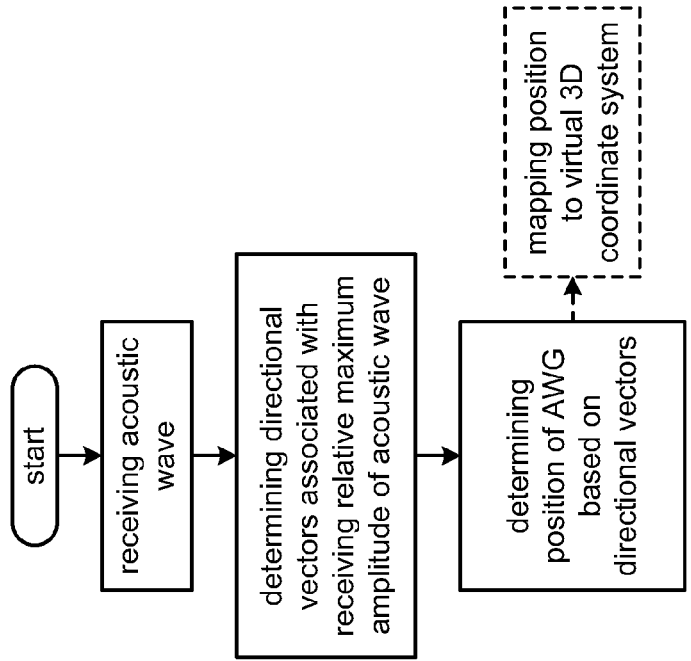
FIG. 45 is a diagram of an embodiment of a method for determining position of a source that emits acoustic waves.

FIG. 45 is a diagram of an embodiment of a method for determining position of a source that emits acoustic waves. The method operates by receiving an acoustic wave (e.g., such as emitted from an acoustic wave generator). The method then operates by determining directional vectors associated with receiving a relative maximum amplitude of the acoustic wave. Based on the directional vectors, the method operates by determining a position of the source (e.g., the acoustic wave generator).

Once the position of the source (e.g., the acoustic wave generator) is known, the method can continue by mapping this determined position to a virtual 3D (three-dimensional) coordinate system.

Figure 46:
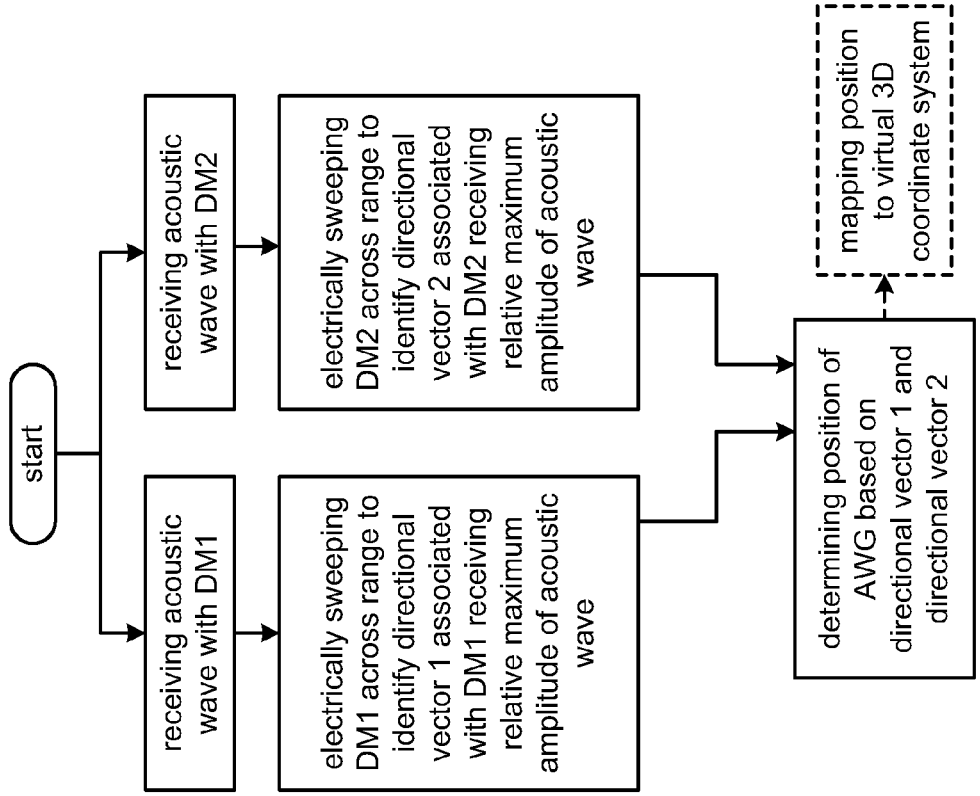
FIG. 46 and FIG. 47 are diagrams embodiments of methods for determining position of a source that emits acoustic waves by performing sweeping of the directionality of at least some of the directional microphones.
Figure 47:
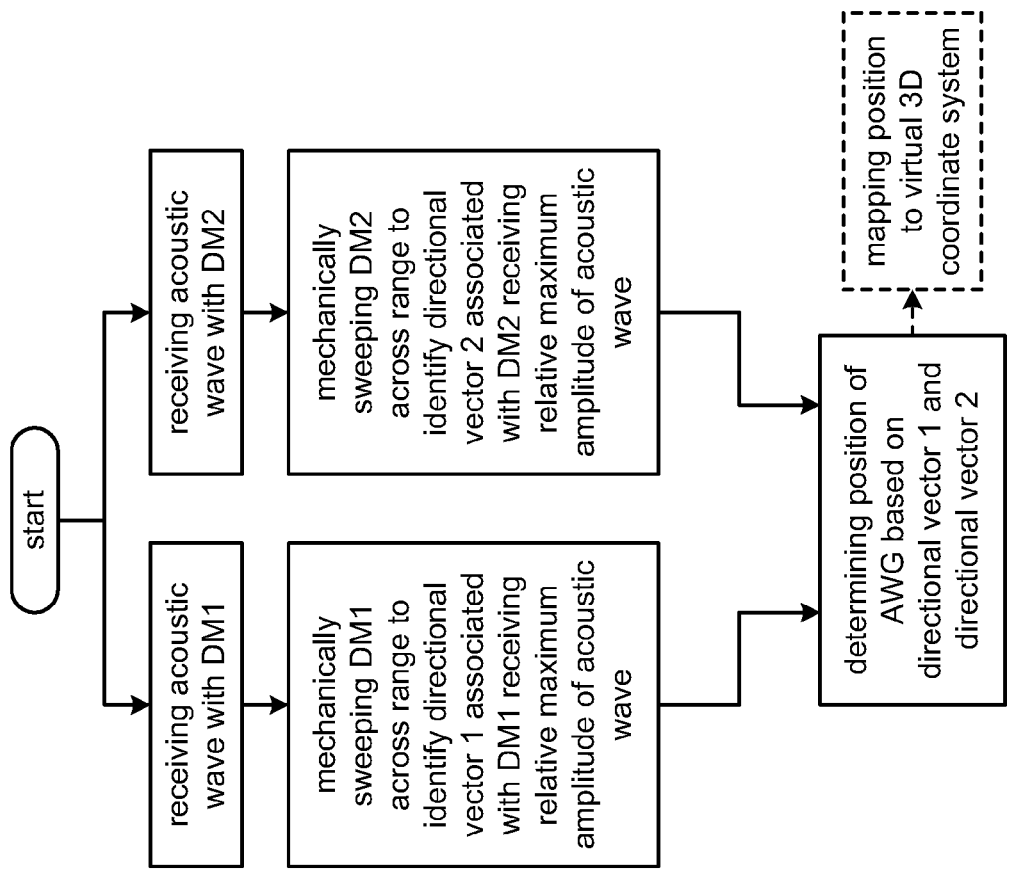

FIG. 46 and FIG. 47 are diagrams embodiments of methods for determining position of a source that emits acoustic waves by performing sweeping of the directionality of at least some of the directional microphones.

Referring to the method of FIG. 46, the method begins by employing a first directional microphone (e.g., DM1) to perform receiving of an acoustic wave. The method also operates by employing a second directional microphone (e.g., DM2) to perform receiving of an acoustic wave. The method then performs sweeping of the directionality of each of the first and second directional microphones across a range to determine first and second directional vectors associated with each of the first and second directional microphones receiving a relative maximum amplitude of the acoustic wave. It is noted that each of the directional microphones may detect a different relative maximum amplitude while still detecting an acoustic emitted from a common source (e.g., the two directional microphones are located in different locations and one directional microphone may be closer to the source than the other, etc.).

In this embodiment, the directionality of the two directional microphones is swept electrically. For example, in an embodiment that includes at least two separate directional microphone arrays, then the gains of the directional microphone in that array can be adjusted to sweep the directionality of the directional microphones across a range to try to determine the directionality associated receiving the relative maximum amplitude of the acoustic wave for that particular directional microphone.

The method then operates by determining a position of the source (e.g., of the acoustic wave generator) based on a first directional vector associated with the first directional microphone and a second directional vector associated with the second directional microphone.

Once the position of the source (e.g., the acoustic wave generator) is known, the method can continue by mapping this determined position to a virtual 3D (three-dimensional) coordinate system.

Referring to the method of FIG. 47, this embodiment is somewhat analogous to the previous embodiment, a at least one difference being that the directionality sweeping is performed mechanically (e.g., using integrated actuators that allow the re-positioning of the directional microphones, by using actuators on which the directional microphones are mounted to adjust the physical orientation of the directional microphones, etc.). It is noted also that a combination of both electrical and mechanical directionality sweeping may be employed in another embodiment as well without departing from the scope and spirit of the invention.

Referring to the method of FIG. 47, the method begins by employing a first directional microphone (e.g., DM1) to perform receiving of an acoustic wave. The method also operates by employing a second directional microphone (e.g., DM2) to perform receiving of an acoustic wave. The method then performs sweeping of the directionality of each of the first and second directional microphones across a range to determine first and second directional vectors associated with each of the first and second directional microphones receiving a relative maximum amplitude of the acoustic wave. It is noted that each of the directional microphones may detect a different relative maximum amplitude while still detecting an acoustic emitted from a common source (e.g., the two directional microphones are located in different locations and one directional microphone may be closer to the source than the other, etc.).

Again, in this embodiment, the directionality of the two directional microphones is swept mechanically (e.g., using actuators integrated with a directional microphone, actuators on which a directional microphone is mounted, etc.). The method then operates by determining a position of the source (e.g., of the acoustic wave generator) based on a first directional vector associated with the first directional microphone and a second directional vector associated with the second directional microphone.

Once the position of the source (e.g., the acoustic wave generator) is known, the method can continue by mapping this determined position to a virtual 3D (three-dimensional) coordinate system.

It is noted that the various modules (e.g., processing modules, baseband processing modules, MAC processing modules, game consoles, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus, comprising:
    a plurality of directional microphones for receiving an acoustic wave from an acoustic wave generator within an environment defined by respective, predetermined locations of the plurality of directional microphones around the acoustic wave generator movable within the environment; and
    a processing module for determining a position of the acoustic wave generator with respect to the respective, predetermined locations of the plurality of directional microphones around the acoustic wave generator based on a plurality of directional vectors that corresponds to receiving a relative maximum amplitude of the acoustic wave by the plurality of directional microphones.

2. The apparatus of claim 1, wherein:
the acoustic wave generator is an ultrasonic wave generator;
the acoustic wave is an ultrasonic wave; and
at least one of the plurality of directional microphones has a frequency response sufficiently broad for detecting the ultrasonic wave.

3. The apparatus of claim 1, wherein:
the processing module is operative to map the position of the acoustic wave generator within a virtual three-dimensional coordinate system.

4. The apparatus of claim 1, wherein:
a directionality of at least one of the plurality of directional microphones is mechanically swept to detect the relative maximum amplitude of the acoustic wave.

5. The apparatus of claim 1, wherein:
a directionality of at least one of the plurality of directional microphones is electrically swept to detect the relative maximum amplitude of the acoustic wave.

6. The apparatus of claim 1, wherein:
the plurality of directional microphones includes a directional microphone array composed of more than one directional microphone.

7. The apparatus of claim 6, wherein:
gains of the more than one directional microphone are independently adjustable.

8. The apparatus of claim 1, wherein:
the processing module is operative to determine the position of the acoustic wave generator during a first time;
the processing module is operative to determine at least one additional position of the acoustic wave generator during a second time; and
the processing module is operative to estimate movement of the acoustic wave generator by comparing the determined position and the at least one additional determined position.

9. The apparatus of claim 1, wherein:
at least one of the plurality of directional microphones is a micro-electrical- mechanical system (MEMS) microphone composed of a pressure sensitive diaphragm etched into an integrated circuit.

10. The apparatus of claim 1, wherein:
at least one of the plurality of directional microphones includes a first radio frequency (RF) transceiver;
the processing module includes a second RF transceiver;
the first RF transceiver transmits an RF signal to the second RF transceiver; and
based on the received RF signal, the processing module determines a distance between the processing module and the at least one of the plurality of directional microphones.

11. An apparatus, comprising:
a gaming object, for movable use within a gaming environment, for emitting an acoustic wave;
a plurality of directional microphones for receiving the acoustic wave, the gaming environment defined by respective, predetermined locations of the plurality of directional microphones around the gaming object within the gaming environment; and
a game console for determining position of the gaming object with respect to the respective, predetermined locations of the plurality of directional microphones around the gaming object based on a plurality of directional vectors that corresponds to receiving a relative maximum amplitude of the acoustic wave by the plurality of directional microphones.

12. The apparatus of claim 11, wherein:
the acoustic wave is an ultrasonic wave; and
at least one of the plurality of directional microphones has a frequency response sufficiently broad for detecting the ultrasonic wave.

13. The apparatus of claim 11, wherein:
the gaming object is associated with a player located within the gaming environment; and
the game console is operative to determine position of the player based on the position of the gaming object.

14. The apparatus of claim 11, wherein:
the game console is operative to map the position of the gaming object within a virtual three-dimensional coordinate system.

15. The apparatus of claim 11, wherein:
a directionality of at least one of the plurality of directional microphones is mechanically swept to detect the relative maximum amplitude of the acoustic wave.

16. The apparatus of claim 11, wherein:
a directionality of at least one of the plurality of directional microphones is electrically swept to detect the relative maximum amplitude of the acoustic wave.

17. The apparatus of claim 11, wherein:
the plurality of directional microphones includes a directional microphone array composed of more than one directional microphone.

18. The apparatus of claim 17, wherein:
gains of the more than one directional microphone are independently adjustable.

19. The apparatus of claim 11, wherein:
the game console is operative to determine the position of the gaming object during a first time;
the game console is operative to determine at least one additional position of the gaming object during a second time; and
the game console is operative to estimate movement of the gaming object by comparing the determined position and the at least one additional determined position.

20. The apparatus of claim 11, wherein:
at least one of the plurality of directional microphones is a micro-electrical- mechanical system (MEMS) microphone composed of a pressure sensitive diaphragm etched into an integrated circuit.

21. The apparatus of claim 11, wherein:
at least one of the plurality of directional microphones includes a first radio frequency (RF) transceiver;
the game console includes a second RF transceiver;
the first RF transceiver is operative to transmit an RF signal to the second RF transceiver; and
based on the received RF signal, the game console is operative to determine a distance between the game console and the at least one of the plurality of directional microphones.

22. A method, comprising:
operating a plurality of directional microphones for receiving an acoustic wave from an acoustic wave generator within an environment defined by respective, predetermined locations of the plurality of directional microphones around the acoustic wave generator movable within the environment; and
determining a position of the acoustic wave generator with respect to the respective, predetermined locations of the plurality of directional microphones around the acoustic wave generator based on a plurality of directional vectors that corresponds to receiving a relative maximum amplitude of the acoustic wave by the plurality of directional microphones.

23. The method of claim 22, wherein:
the acoustic wave generator is an ultrasonic wave generator;
the acoustic wave is an ultrasonic wave; and
at least one of the plurality of directional microphones has a frequency response sufficiently broad for detecting the ultrasonic wave.

24. The method of claim 22, wherein:
mapping the position of the acoustic wave generator within a virtual three-dimensional coordinate system.

25. The method of claim 22, wherein:
mechanically sweeping a directionality of at least one of the plurality of directional microphones for detecting the relative maximum amplitude of the acoustic wave.

26. The method of claim 22, wherein:
electrically sweeping a directionality of at least one of the plurality of directional microphones is swept for detecting the relative maximum amplitude of the acoustic wave.

27. The method of claim 22, wherein:
the plurality of directional microphones including a directional microphone array composed of more than one directional microphone.

* * * * *